(12) United States Patent
Kabbinale et al.

(10) Patent No.: US 11,165,638 B1
(45) Date of Patent: Nov. 2, 2021

(54) AUTOMATICALLY GENERATING AND PROVISIONING A CUSTOMIZED PLATFORM FOR SELECTED APPLICATIONS, TOOLS, AND ARTIFICIAL INTELLIGENCE ASSETS

(71) Applicant: Accenture Global Solutions Limited, Dublin (IE)

(72) Inventors: Ravindra Kabbinale, Bangalore (IN); Aditi Kulkarni, Bengaluru (IN); Vijeth Srinivas Hegde, Bangalore (IN); Rajendra Prasad Tanniru, Basking Ridge, NJ (US); Koushik M Vijayaraghavan, Chennai (IN); Sanjay Singatalur, Bengaluru (IN); Suhas Nagaraju, Bangalore (IN); Amrutha Pervody Bhat, Bangalore (IN); Rajalakshmy Iyer, Bangalore (IN); Sreenath Kothavoor, Kannur (IN); Haridas Kadaba Srinivasan, Bangalore (IN); A. Akhila, Bangalore (IN); Narasimhachar Goutham, Bengaluru (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/899,169

(22) Filed: Jun. 11, 2020

(30) Foreign Application Priority Data

Apr. 29, 2020 (IN) .............................. 202041018384

(51) Int. Cl.
*H04L 12/24* (2006.01)
*G06F 9/50* (2006.01)
(Continued)

(52) U.S. Cl.
CPC ........ *H04L 41/0806* (2013.01); *G06N 20/00* (2019.01); *H04L 41/0859* (2013.01); *H04L 41/0886* (2013.01); *H04L 67/34* (2013.01)

(58) Field of Classification Search
CPC ............. H04L 41/0806; H04L 41/0859; H04L 41/0886; H04L 67/34; G06N 20/00
See application file for complete search history.

(56) References Cited

U.S. PATENT DOCUMENTS

| 2008/0313595 | A1* | 12/2008 | Boulineau | .......... G06Q 30/0201 717/101 |
| 2015/0163260 | A1* | 6/2015 | Dayan | ................... H04L 51/046 709/206 |

(Continued)

*Primary Examiner* — Christopher B Robinson
(74) *Attorney, Agent, or Firm* — Harrity & Harrity, LLP

(57) ABSTRACT

A device may receive, from the client device, provisioning data selected from a user interface and identifying a cloud provider or on premise resources, an infrastructure, applications, tools, and artificial intelligence (AI) assets for provisioning a customized platform. The device may process the provisioning data, with a machine learning model, to identify conflicting or redundant applications, tools, or AI assets and to generate updated provisioning data, and may determine computing resource data identifying computing resources required for execution of the applications, tools, and AI assets. The device may obtain the applications, tools, and AI assets from a data structure, and may generate a customized template based on the computing resources and the applications, tools, and AI assets. The device may execute the customized template to provision the computing resources with the applications, tools, and AI assets and to create the customized platform.

20 Claims, 15 Drawing Sheets

(51) Int. Cl.
*H04L 29/08* (2006.01)
*G06F 8/60* (2018.01)
*G06F 8/70* (2018.01)
*G06F 21/62* (2013.01)
*H04L 29/06* (2006.01)
*G06F 9/451* (2018.01)
*G06N 20/00* (2019.01)

(56) References Cited

U.S. PATENT DOCUMENTS

| | | | |
|---|---|---|---|
| 2016/0112497 A1* | 4/2016 | Koushik | G06F 8/61 |
| | | | 726/7 |
| 2018/0027006 A1* | 1/2018 | Zimmermann | H04L 63/0245 |
| | | | 726/11 |
| 2018/0131765 A1* | 5/2018 | Puleston | G06F 16/907 |
| 2019/0028336 A1* | 1/2019 | Coronado | H04L 63/10 |
| 2019/0102700 A1* | 4/2019 | Babu | G06N 5/025 |
| 2020/0159507 A1* | 5/2020 | Bodin | G06F 8/30 |

* cited by examiner

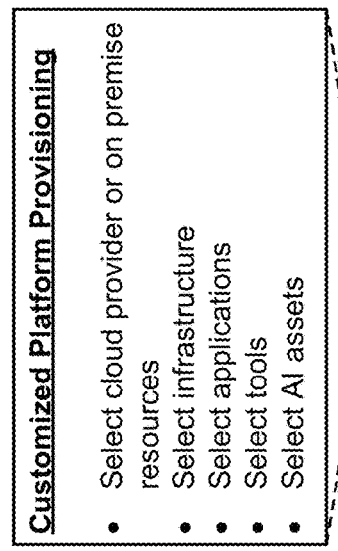
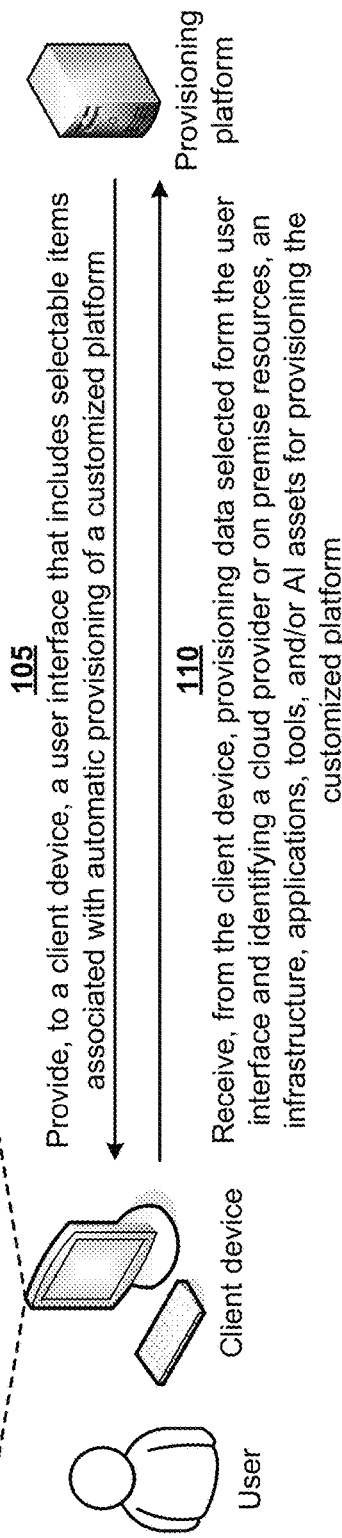
FIG. 1A

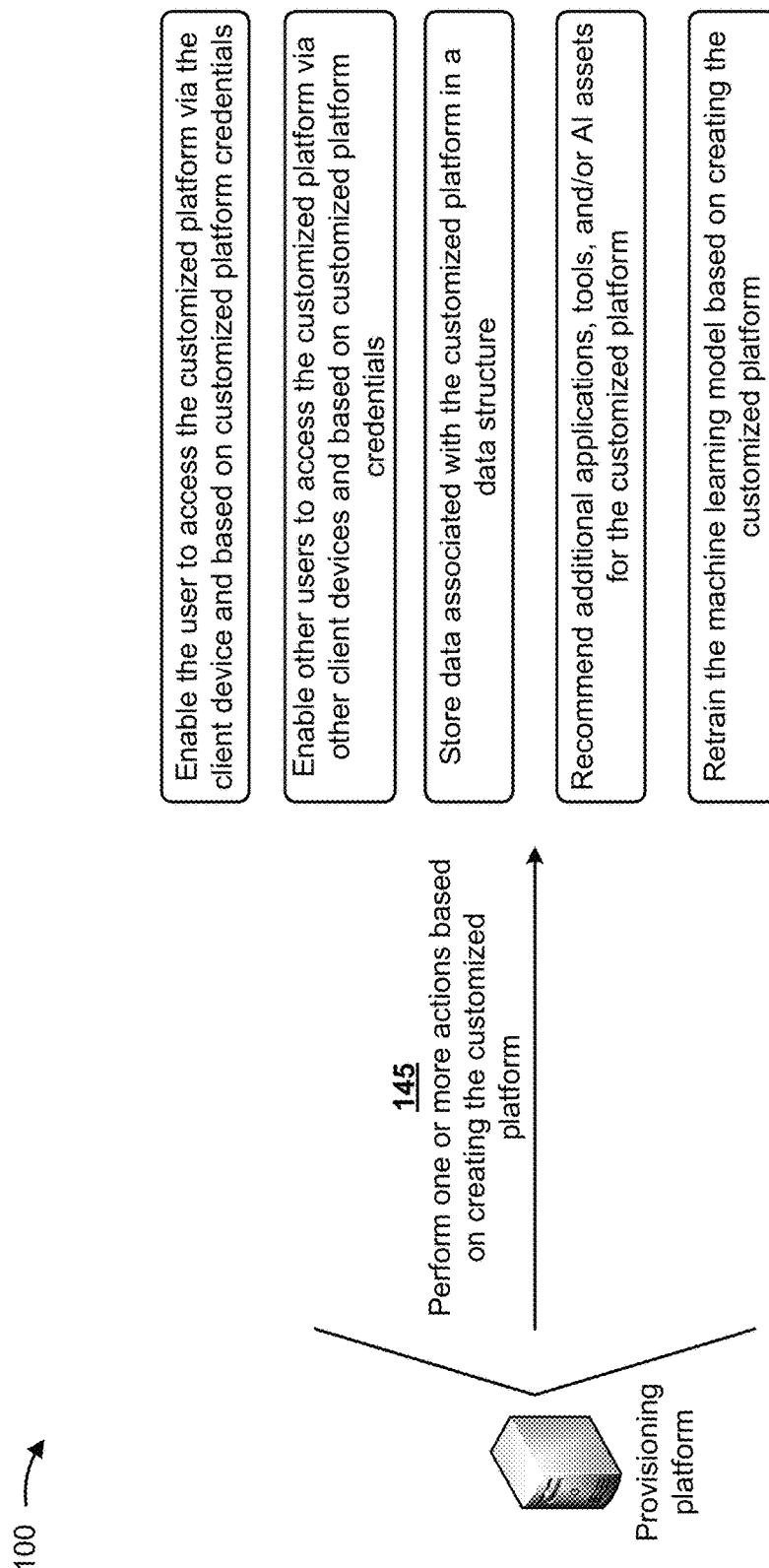

AUTOMATICALLY GENERATING AND PROVISIONING A CUSTOMIZED PLATFORM FOR SELECTED APPLICATIONS, TOOLS, AND ARTIFICIAL INTELLIGENCE ASSETS

RELATED APPLICATION

This application claims priority to Indian Provisional Patent Application No. 202041018384, filed on Apr. 29, 2020, and entitled "AUTOMATICALLY GENERATING AND PROVISIONING A CUSTOMIZED PLATFORM FOR SELECTED APPLICATIONS, TOOLS, AND ARTIFICIAL INTELLIGENCE ASSETS", the content of which is incorporated by reference herein in its entirety.

BACKGROUND

The evolution of technology has generated a need to accelerate software delivery. Software development and information-technology operations (DevOps) aims to shorten a software development life cycle and provide continuous delivery of high quality software.

SUMMARY

According to some implementations, a method may include providing, to a client device, a user interface that includes selectable items associated with automatic provisioning of a customized platform, and receiving, from the client device, provisioning data selected from the user interface and identifying a cloud provider or on premise resources, an infrastructure, and one or more applications, tools, and artificial intelligence assets for provisioning the customized platform. The method may include processing the provisioning data, with a machine learning model, to identify conflicting or redundant applications, tools, or artificial intelligence assets included in the provisioning data and to generate updated provisioning data, and determining computing resource data identifying computing resources, from the cloud provider or the on premise resources, required for execution of the one or more applications, tools, and artificial intelligence assets. The method may include obtaining the one or more applications, tools, and artificial intelligence assets, identified in the updated provisioning data, from a data structure, and generating a customized template based on the computing resources, identified in the computing resource data, and the one or more applications, tools, and artificial intelligence assets. The method may include executing the customized template to provision the computing resources with the one or more applications, tools, and artificial intelligence assets and to create the customized platform, and performing one or more actions based on creating the customized platform.

According to some implementations, a device may include one or more memories and one or more processors to provide, to a client device, a user interface that includes selectable items associated with automatic provisioning of a customized platform, and receive, from the client device, provisioning data selected from the user interface and identifying a cloud provider or on premise resources, an infrastructure, and one or more applications, tools, and artificial intelligence assets for provisioning the customized platform. The one or more processors may process the provisioning data, with a machine learning model, to identify conflicting or redundant applications, tools, or artificial intelligence assets included in the provisioning data and to generate updated provisioning data, wherein the machine learning model is trained based on historical data identifying historical applications, historical tools, historical artificial intelligence assets, and historical conflicts or redundancies associated with the historical applications, the historical tools, and the historical artificial intelligence assets. The one or more processors may determine computing resource data identifying computing resources, from the cloud provider or the on premise resources, required for execution of the one or more applications, tools, and artificial intelligence assets, and may obtain the one or more applications, tools, and artificial intelligence assets, identified in the updated provisioning data, from a data structure. The one or more processors may generate a customized template based on the computing resources, identified in the computing resource data, and the one or more applications, tools, and artificial intelligence assets, and may execute the customized template to provision the computing resources with the one or more applications, tools, and artificial intelligence assets and to create the customized platform. The one or more processors may perform one or more actions based on creating the customized platform.

According to some implementations, a non-transitory computer-readable medium may store one or more instructions that, when executed by one or more processors of a device, may cause the one or more processors to provide, to a client device, a user interface that includes: selectable items associated with automatic provisioning of a customized platform, and recommended items associated with automatic provisioning of the customized platform, wherein the recommended items are determined based on a profile associated with a user of the client device. The one or more instructions may cause the one or more processors to receive, from the client device, provisioning data selected from the user interface and identifying a cloud provider or on premise resources, an infrastructure, and one or more applications, tools, and artificial intelligence assets for provisioning the customized platform, and process the provisioning data to identify conflicting or redundant applications, tools, or artificial intelligence assets included in the provisioning data and to generate updated provisioning data. The one or more instructions may cause the one or more processors to determine computing resource data identifying computing resources, from the cloud provider or the on premise resources, required for execution of the one or more applications, tools, and artificial intelligence assets, and obtain the one or more applications, tools, and artificial intelligence assets, identified in the updated provisioning data, from a data structure. The one or more instructions may cause the one or more processors to generate a customized template based on the computing resources, identified in the computing resource data, and the one or more applications, tools, and artificial intelligence assets, and execute the customized template to provision the computing resources with the one or more applications, tools, and artificial intelligence assets and to create the customized platform. The one or more instructions may cause the one or more processors to perform one or more actions based on creating the customized platform.

BRIEF DESCRIPTION OF THE DRAWINGS

FIGS. 1A-1H are diagrams of one or more example implementations described herein.

DETAILED DESCRIPTION

Figure 1B:
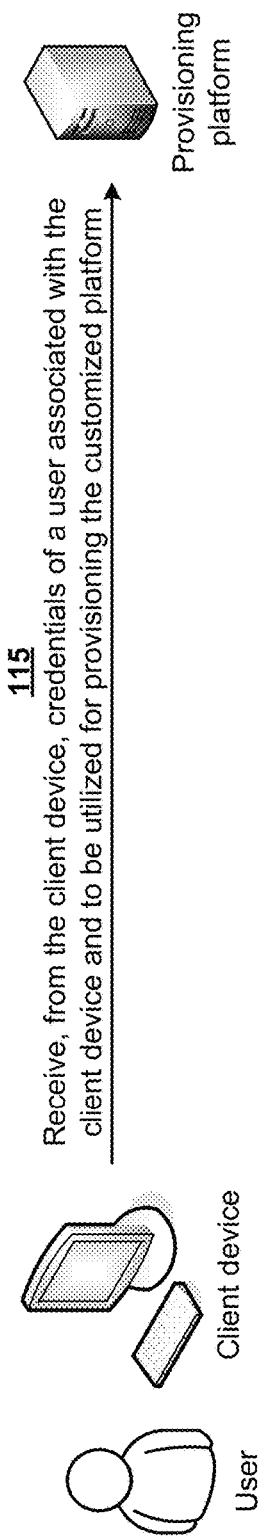

The following detailed description of example implementations refers to the accompanying drawings. The same reference numbers in different drawings may identify the same or similar elements.

Implementing software development and information-technology operations (DevOps) platforms requires a strong knowledge base, skillset, and effort to identify a correct set of infrastructure, applications, tools, and/or the like for the DevOps platforms. Current techniques to identify, install, configure, and/or the like required infrastructure, applications, tools, and/or the like for DevOps platforms are time consuming and resource intensive. Thus, current techniques for implementing a DevOps platform waste computing resources (e.g., processing resources, memory resources, communication resources, and/or the like), networking resources, human resources, and/or the like. The wasted resources are associated with manually processing (e.g., identifying, installing, configuring, and/or the like) of required infrastructure, applications, tools, and/or the like for a DevOps platform; identifying misconfigurations in the DevOps platform; correcting the misconfigurations in the DevOps platform, and/or like.

Some implementations described herein provide a provisioning platform that dynamically generates and provisions a customized platform for selected applications, tools, and artificial intelligence assets (e.g., for providing a DevOps platform used in a particular software development suitable and optimal for a particular software development and deployment). For example, an optimal combination of technical components can be determined and included into a DevOps platform for a software which provides an optimized technical efficiency (e.g., by reducing irrelevant components and/or inconsistent combinations). In this manner, components (e.g., applications, tools, and/or AI assets) that are closely related and used in a software development environment for a DevOps can be optimally combined and used in developing, testing, and deploying a software. For example, the provisioning platform may provide, to a client device, a user interface that includes selectable items associated with automatic provisioning of a customized platform, and may receive, from the client device, provisioning data selected from the user interface and identifying a cloud provider or on premise resources, an infrastructure, and one or more applications, tools, and artificial intelligence assets for provisioning the customized platform. The provisioning platform may process the provisioning data to identify conflicting or redundant applications, tools, or artificial intelligence assets included in the provisioning data and to generate updated provisioning data, and may determine computing resource data identifying computing resources, from the cloud provider or the on premise resources, required for execution of the one or more applications, tools, and artificial intelligence assets. The provisioning platform may obtain the one or more applications, tools, and artificial intelligence assets, identified in the updated provisioning data, from a data structure, and may generate a customized template based on the computing resources, identified in the computing resource data, and the one or more applications, tools, and artificial intelligence assets. The provisioning platform may execute the customized template to provision the computing resources with the one or more applications, tools, and artificial intelligence assets and to create the customized platform, and may perform one or more actions based on creating the customized platform.

In this way, the provisioning platform dynamically generates and provisions a customized platform for selected applications, tools, and artificial intelligence assets. The provisioning platform may generate and provision a customized platform (e.g., a DevOps platform) for a user based on user selected applications, tools, artificial intelligence assets for the customized platform. In some examples, the provisioning platform may provision the customized platform using a machine learning model. This, in turn, conserves computing resources, networking resources, and/or the like that would otherwise have been wasted by manually processing (e.g., identifying, installing, configuring, and/or the like) of required infrastructure, applications, tools, and/or or the like for a DevOps platform; identifying misconfigurations in the DevOps platform; correcting the misconfigurations in the DevOps platform, and/or like.

FIGS. 1A-1H are diagrams of one or more example implementations 100 described herein. As shown in FIG. 1A, a client device may be associated with a provisioning platform. The client device may include a mobile device, a computer, and/or the like. The provisioning platform may dynamically generate and provision a customized platform for selected applications, tools, and/or artificial intelligence assets, as described herein. The provisioning platform may be hosted by a cloud computing environment or by one or more server devices, and may be associated with one or more client devices. The client device and the provisioning platform are further described below in connection with FIG. 4.

As further shown in FIG. 1A, and by reference number 105, the provisioning platform may provide, to the client device, a user interface that includes selectable items associated with automatic provisioning of a customized platform. In some implementations, the customized platform may include a customized DevOps platform. As will be understood from the details below, the customized platform may be provisioned via any one of a plurality of cloud providers or any one of a plurality of on premises resources.

As shown in FIG. 1A, the selectable items of the user interface may include one or more selectable items representing cloud providers (e.g., providers of cloud computing services), one or more selectable items representing on premise resources (e.g., resources located at a user location associated with the client device), one or more selectable items representing infrastructures (e.g., one or more devices for implementing DevOps platforms), one or more selectable items representing tools (e.g., one or more software tools for implementing DevOps platforms), one or more selectable items representing applications (e.g., one or more software applications for implementing DevOps platforms), one or more selectable items representing artificial intelligence assets (e.g., one or more artificial intelligence models for implementing DevOps platforms), and/or the like. The selectable items may further include one or more selectable items representing one or more types of platform as a service (PaaS).

In some implementations, when providing the user interface, the provisioning platform may determine one or more recommended items for a user of the client device based on a profile associated with the user (or a user profile) and provide the one or more recommended items, with the selectable items, in the user interface. For example, the user profile may include information identifying one or more cloud providers, on premises resources, infrastructures, tools, applications, and/or artificial intelligence assets that have been used by the user in the past, have been used by one or more other users, associated with the user (e.g., from a same company, a same organization, and/or the like), in the past, have been identified as preferred by the user, have been identified as preferred by the one or more other users, and/or the like. The user profile may be stored in a data structure. In some implementation, the user may provide information identifying one or more other users that may access the customized platform and information identifying one or more other client devices that may be used to access the customized platform. The information identifying the one or more other users and the one or more other clients may be included in another user profile associated with the customized platform. The provisioning platform may generate the other user profile during or subsequent to provisioning of the customized platform.

The cloud providers may include one or more providers of cloud computing services that may be used for implementing the customized platform. The on premise resources may include one or more resources that may be located at a user location of a user of the client device and that may be used by the user for implementing the customized platform. For example, the one or more resources may include one or more devices at the user location. The infrastructures may include one or more devices that are used for implementing the customized platform. The infrastructures may provide data processing capabilities, data collection capabilities, data storage capabilities, network setup capabilities, and/or the like. The infrastructures may include bare metal infrastructures that may act as a base for a development environment, a DevOps environment, and/or application servers. The infrastructures may provide the ability to capitalize on container technology, curtail effort and expense on data processing capabilities, provide tools that collect data, set up complex networks and storage, and/or the like. The tools may include one or more software tools that may be used for implementing the customized platform. For example, the tools may be used to customize a DevOps platform. The tools may include open source software tools. In some implementations, multiple tools may be selected to customize a DevOps platform. The multiple tools may be selected based on a single input from a user via the client device. In other words, the provisioning platform may provide a "one-click" solution for selecting multiple tools.

The applications may include one or more applications that may be used for implementing the customized platform. The applications may run on one or more of the infrastructures to implement the customized platform. The applications may be associated with different DevOps technologies. In some implementations, the applications may be pre-configured with one or more software tools. In some implementations, multiple applications may be selected as a bundle of software associated with a DevOps template (e.g., to implement a customized DevOps platform). The DevOps template may include a continuous integration and continuous deployment template. The artificial intelligence assets may include one or more artificial intelligence models that may be used for implementing the customized platform. For example, the one or more artificial intelligence models may be used for implementing the customized platform by way of automation, recommendation, and/or prediction in conjunction with a machine learning model. The artificial intelligence assets may enable accurate prediction and increased speed in decision making, through machine learning and artificial engineering, to implement a customized DevOps platform.

As further shown in FIG. 1A, and by reference number 110, the provisioning platform may receive, from the client device, provisioning data selected from the user interface and identifying a cloud provider or on premise resources, an infrastructure, a type of PaaS, one or more applications, one or more tools, and/or one or more artificial intelligence (AI) assets for provisioning the customized platform. For example, the client device may select, from the user interface, information identifying a cloud provider or on premise resources, an infrastructure, one or more applications, one or more tools, and/or one or more artificial intelligence (AI) assets as provisioning data and may transmit the provisioning data to the provisioning platform. In some implementations, the selections of the client device may be used to customize a template to create a customized template, which customized template may be executed to create a customized platform, as explained in more detail below.

In some implementations, the provisioning platform may receive, from the client device, data indicating that one of the selectable items of the user interface is selected. The provisioning platform may update the user interface, to generate an updated user interface, based on the data indicating that one of the selectable items of the user interface is selected, and provide the updated user interface to the client device. For example, the user interface may be updated to include information indicating that the one of the selectable items of the user interface has been selected.

In some implementations, the provisioning platform may receive, from the client device along with the provisioning data, information identifying the user (e.g., a username, an identifier, and/or the like of the user), information identifying the client device (e.g., a name, a network address such as a media access control (MAC) address, and/or the like of the client device), the information identifying the one or more other users (e.g., usernames, identifiers, and/or the like of the one or more other users), the information identifying one or more other client devices (e.g., names, network addresses such as MAC addresses, and/or the like of the one or more other client devices, and/or the like), and/or the like. In some implementations, the provisioning platform may generate information identifying the customized platform (e.g., a name, an identifier, and/or the like) based on receiving the provisioning data. The provisioning platform may associate the information identifying the customized platform with the information identifying the user, the information identifying the client device, the information identifying the one or more other users, and/or the information identifying the one or more other client devices.

As shown in FIG. 1B, and by reference number 115, the provisioning platform may receive, from the client device, credentials of the user associated with the client device. The credentials may be used to authenticate the user to access computing resources associated with the cloud provider. In some implementations, after receiving the provisioning data from the client device, the provisioning platform may prompt the user, via the user interface, for information that may be used to authenticate the user to access the computing resources associated with the cloud provider. Based on the prompt, the user may submit the credentials via the user interface and the provisioning platform may receive, from the client device, the credentials submitted via the user interface. The credentials may include a username, a password, a passcode, a biometric, and/or the like of the user.

In some implementations, after receiving the credentials, the provisioning platform may validate and encrypt the credentials and securely store the credentials in a credential vault after validation and encryption. Accordingly, the provisioning platform may provide a two-tier security to ensure safekeeping of the credentials. The credentials (after validation and encryption) may be stored, in the credential vault, in association with the information identifying the user and/or the information identifying the client device.

The provisioning platform may validate the credentials by determining whether the credentials include a particular combination of alphanumeric characters, a particular biometric, and/or the like. The provisioning platform may cause the credentials to be encrypted by way of an application program interface (API) call. For instance, the API call may cause the credentials to be encrypted using one or more keys (or cryptographic keys). In some implementations, the one or more keys may be associated with a key management service. For example, the provisioning platform may use the key management service to manage (e.g., create and/or protect) cryptographic keys used to encrypt information that is used as part of provisioning customized platforms. The credential vault may include a data structure that is used to store encrypted credentials that are used to access customized platforms.

Figure 1C:
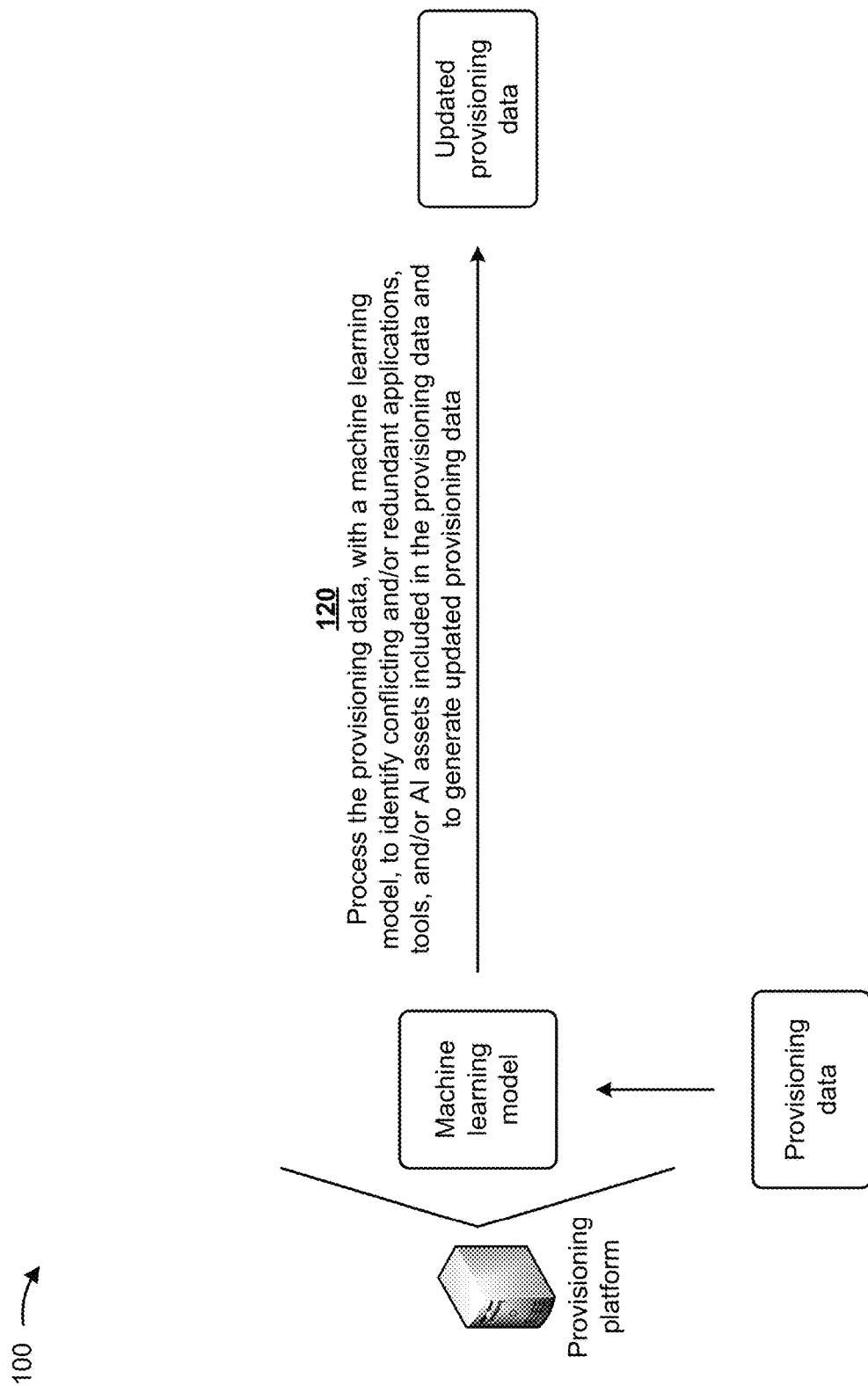

As shown in FIG. 1C, and by reference number 120, the provisioning platform may process the provisioning data, with a machine learning model, to identify conflicting and/or redundant (or duplicate) applications, tools, and/or AI assets included in the provisioning data. The provisioning platform may generate updated provisioning data based on identifying the conflicting and/or redundant applications, tools, and/or AI assets.

In some implementations, the provisioning platform may train the machine learning model with historical data (e.g., historical data identifying applications, tools, and/or AI assets to be provisioned for customized platforms, and/or historical conflicts or redundancies associated with the applications, the tools, and/or the AI assets) to identify redundancies and/or conflicts in the provisioning data identifying applications, tools, and/or AI assets. For example, the provisioning platform may train the machine learning model in a manner similar to the manner described below in connection with FIG. 2. The provisioning platform may train the machine learning model with a historical data set that includes data regarding applications, tools, AI assets, and/or the like utilized for customized platforms.

Alternatively, rather than training the machine learning model, the provisioning platform may obtain the machine learning model from another system or device that trained the machine learning model. In this case, the other system or device may obtain the historical data (e.g., the historical data discussed above) for use in training the machine learning model, and may periodically receive additional data that the other system or device may use to retrain the machine learning model in order to update the machine learning model.

The provisioning platform may process the provisioning data, using the machine learning model, to identify redundancies and/or conflicts in the provisioning data (e.g., redundancies and/or conflicts in the specified applications, tools, and/or AI assets). The provisioning platform may use the machine learning model to process the provisioning data in a manner similar to the manner described below in connection with FIG. 3.

In some implementations, the provisioning platform may process the provisioning data, without the machine learning model, to identify conflicting and/or redundant (or duplicate) applications, tools, and/or AI assets included in the provisioning data. For example, the provisioning platform may compare information regarding one or more tools (identified in the provisioning data) and information regarding one or more applications (identified in the provisioning data), compare the information regarding the one or more tools and information regarding one or more AI assets (identified in the provisioning data), and/or compare the information regarding the one or more applications and the information regarding the one or more AI assets.

For instance, the provisioning platform may compare identifiers of the one or more tools and identifiers of tools that are included as part of the one or more applications, compare a description of the one or more tools and a description of the tools of the one or more applications, compare a function or a purpose of the one or more tools and a function or a purpose of the tools of the one or more applications, compare the description of the one or more tools and a description of the one or more AI assets, compare the function or the purpose of the one or more tools and a function or a purpose of the one or more AI assets, compare the description of the one or more applications and the description of the one or more AI assets, and/or the like.

The provisioning platform may identify the conflicting and/or redundant applications, tools, and/or AI assets based on results of the comparisons. For example, the provisioning platform may determine that the one or more tools are conflicting with respect to the one or more applications if the one or more tools are incompatible with the one or more applications. Additionally, or alternatively, the provisioning platform may determine that the one or more tools are redundant with respect to the one or more applications if the one or more applications include the one or more tools or include tools similar to the one or more tools (e.g., perform a similar function as the one or more tools). Additionally, or alternatively, the provisioning platform may determine that the one or more AI assets are conflicting with respect to the one or more applications if the one or more AI assets are incompatible with the one or more applications. The comparisons and the determinations above are provided merely as examples. Other examples may differ from what is described with regard to the comparisons and the determinations above.

After identifying the conflicting and/or redundant applications, tools, and/or AI assets from the provisioning data (with or without the machine learning model), the provisioning platform may remove information regarding redundant tools from the provisioning data to generate the updated provisioning data. In some implementations, the provisioning platform may remove the information regarding the redundant tools from the provisioning data without notifying the user of the client device and generate the updated provisioning data based on removing the information regarding the redundant tools. Alternatively, the provisioning platform may remove the information regarding the redundant tools from the provisioning data and provide a notification to the client device via the user interface. The notification may identify the redundant tools that have been removed.

In some implementations, the provisioning platform may provide, to the client device and via the user interface, a notification identifying the redundant tools that are to be removed. The user may submit, via the user interface and in response to the notification, information indicating approval to remove one or more of the redundant tools and the provisioning platform may receive an indication, from the client device, indicating the approval to remove the one or more of the redundant tools. The provisioning platform may then remove information regarding the one or more of the redundant tools from the provisioning data based on the indication and generate the updated provisioning data based on the removal.

Additionally, or alternatively to the removal, the provisioning platform may provide recommendations, via the user interface, regarding one or more replacement applications, tools, and/or AI assets that may replace conflicting applications, tools, and/or AI assets identified in the provisioning data. In some implementations, the provisioning platform may identify the one or more replacement applications, tools, and/or AI assets using a recommendation machine learning model. For example, historical data, used to train the recommendation machine learning model, may include some or all of the historical data described above and may further include historical data identifying applications, tools, and/or AI assets that were used to resolve the historical conflicts or redundancies associated with the applications, the tools, and/or the AI assets. The recommendation machine learning model may be trained to determine a likelihood that a potential replacement application, tool, or AI asset is a suitable replacement for a conflicting application, tool, or AI asset. The likelihood may be represented as a probability or score that measures a degree of match between functions to be performed by a conflicting application, tool, or AI asset in the customized platform and functions capable of being performed by a potential replacement application, tool, or AI asset.

Additionally, or alternatively, the provisioning platform may identify the one or more replacement applications, tools, and/or AI assets based on descriptions, functions, and/or functionalities of the conflicting applications, tools, and/or AI assets. For example, the descriptions, functions, and/or functionalities of the one or more replacement applications, tools, and/or AI assets may be similar to the descriptions, functions, and/or functionalities of the conflicting applications, tools, and/or AI assets.

Additionally, or alternatively, the provisioning platform may identify the one or more replacement applications, tools, and/or AI assets based on the user profile. For example, the provisioning platform may identify the one or more replacement applications, tools, and/or AI assets based on the information identifying the one or more applications, tools, and/or AI assets that have been used by the user in the past, have been used by one or more other users, associated with the user (e.g., from a same company, a same organization, and/or the like), in the past, have been identified as preferred by the user, have been identified as preferred by the one or more other users, and/or the like.

The techniques used to identify the one or more replacement applications, tools, and/or AI assets discussed above are provided merely as examples. Other examples may differ from what is described with regard to the techniques described above.

In some implementations, the provisioning platform may provide, to the client device and via the user interface, information identifying the conflicting applications, tools, and/or AI assets and information identifying the replacement applications, tools, and/or AI assets. The user may select, via the user interface, information identifying one or more of the replacement applications, tools, and/or AI assets and the provisioning platform may receive the information identifying the one or more of the replacement applications, tools, and/or AI assets. The provisioning platform may then update the provisioning data to generate the updated provisioning data by removing information regarding the conflicting applications, tools, and/or AI assets from the provisioning data and by including information regarding the one or more of the replacement applications, tools, and/or AI assets in the provisioning data. In this regard, in some implementations, one or more applications, tools, and/or AI assets included in the updated provisioning data may be different than one or more applications, tools, and/or AI assets included in the provisioning data. Additionally, or alternatively, one or more applications, tools, and/or AI assets included in the updated provisioning data may include one or more applications, tools, and/or AI assets included in the provisioning data.

In some implementations, the provisioning platform may store at least portion of the updated provisioning data, in a template data structure, as part of data for generating a customized template for provisioning the customized platform (or customized template data). For example, the provisioning platform may store information identifying the applications, tools, and/or AI assets, such as, for example, an identifier, a description, a type, a version, and/or the like for the applications, tools, and/or AI assets. The customized template data may be stored, in the template data structure, in association with the information identifying the customized platform (discussed above). The template data structure may store data that may be used to generate customized templates which may be executed to provision customized platforms (e.g., customized DevOps platforms). One or more of the customized templates may be used to provision different customized platforms. In other words, the one or more of the customized templates may be reused.

Figure 1D:
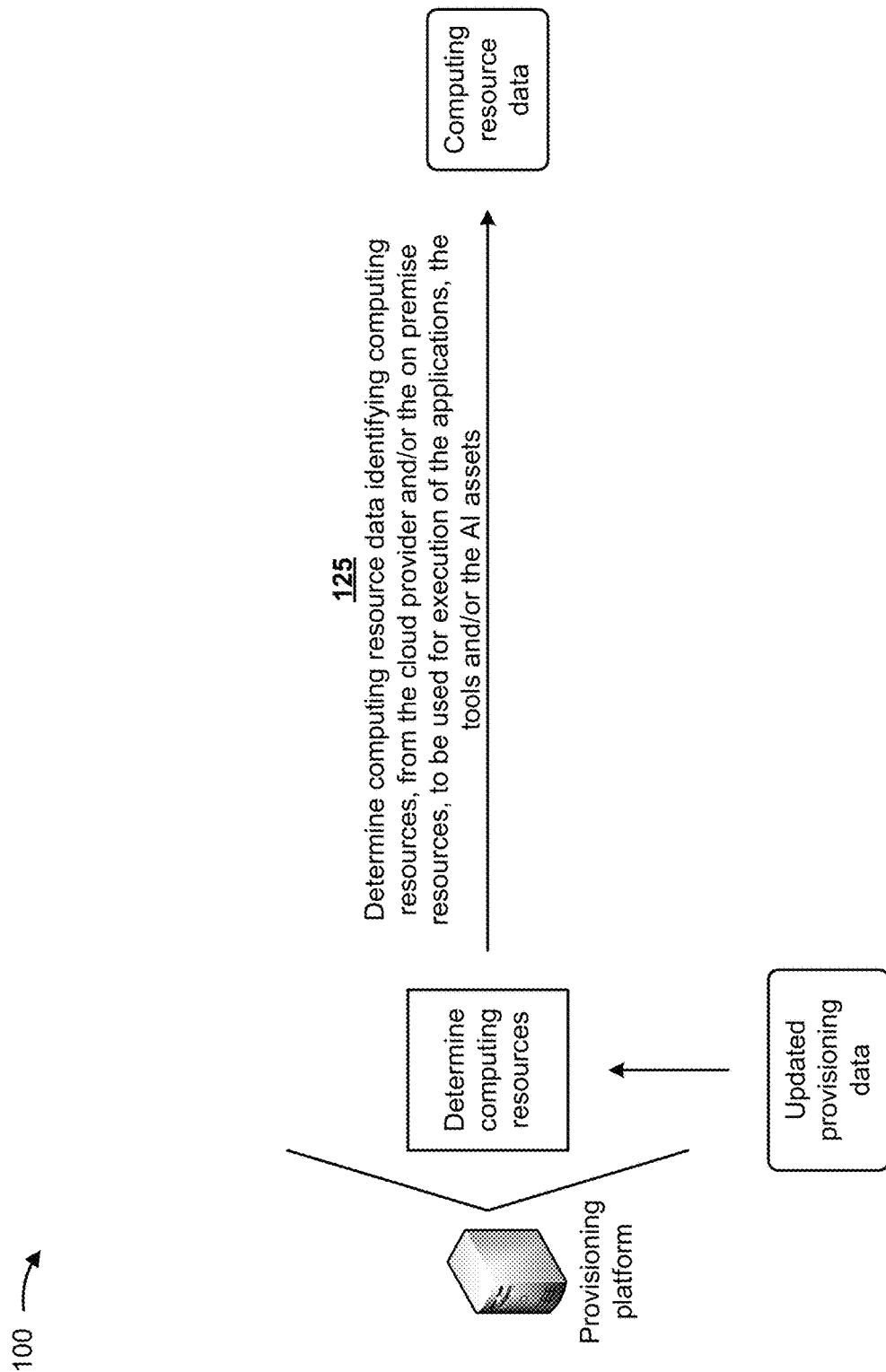

As shown in FIG. 1D, and by reference number 125, the provisioning platform may determine computing resource data identifying computing resources, from the cloud provider and/or the on premise resources, to be used for execution of the applications, the tools, and/or the AI assets. For example, the provisioning platform may determine, from the updated provisioning data, whether the user has selected a cloud provider, on premises resources, or a combination of both. The provisioning platform may determine computing resources (from the selected cloud provider and/or the selected on premise resources) to be used for execution of the applications, the tools, and/or the AI assets identified in the updated provisioning data. The computing resources may include one or more server computers, workstation computers, mainframe devices, other types of computation and/or communication devices, and/or the like. The provisioning platform may then generate the computing resources data which may include information regarding the computing resources. The computing resources may provide processing, operating system, memory, and/or storage that may be utilized for execution of the applications, the tools, and/or the AI assets.

In some implementations, the provisioning platform may determine the computing resource data using a resource-selection machine learning model (which may be trained in a similar manner as the other machine learning models discussed above). The resource-selection machine learning model may be trained with historical data (e.g., historical data identifying applications, tools, and AI assets provisioned for customized platforms, historical data identifying computing resources used for execution of the applications, the tools, and the AI assets on the customized platforms, historical data relating to performance of the computing resources, and/or the like) to determine the computing resources to be used for execution of the applications, the tools, and/or the AI assets. The resource-selection machine learning model may be trained to recommend a combination of computing resources to use with a customized platform, such as one or more types of computing resources, a quantity of computing resources, a location of computing resources (cloud-based and/or on premises), and/or the like. The resource-selection machine learning model may output one or more recommendations of combinations of computing resources. For a particular combination of computing resources, the resource-selection machine learning model may provide a cost value that indicates a cost to use the particular combination of computing resources (e.g., a cost in terms of a one-time cost, a reoccurring cost, an energy cost, a security cost such as an associated measure of security, computational/processing cost, and/or the like). The output(s) of the resource-selection machine learning model may be used to form the computing resource data.

In some implementations, the provisioning platform (e.g., based on the output(s) of the resource-selection machine learning model) may provide to the user, via the user interface, one or more recommendations regarding computing resources. For example, while the updated provisioning data may include information indicating that the user has selected on premises resources, the provisioning platform may determine the cost value (as described above) associated with computing resources for the on premises resources, computing resources for a cloud provider, and/or a combination of both. The provisioning platform may identify a lowest cost value out of the cost value associated with the on premises, the cloud provider, and/or the combination of both and may provide to the user, via the user interface, information regarding the lowest cost value as a recommendation.

Alternatively, the provisioning platform may provide to the user, via the user interface, information regarding the cost value associated with the on premises resources, the cloud provider, and/or the combination of both and may identify the information regarding the lowest cost value as the recommendation. The information regarding the cost value may include information identifying the costs associated with computing resources (as discussed above), one or more types of computing resources, a quantity of computing resources, a location of computing resources (cloud-based and/or on premises), and/or the like. The user may select, via the user interface, information regarding a cost value and the provisioning platform may receive the information regarding the cost value and include the information as the computing resource data.

In some implementations, rather than using the resource-selection machine learning model or as a supplement to using the resource-selection machine learning model, the provisioning platform may determine the computing resource data based on information regarding the applications, the tools, and/or the AI assets selected by the client device via the user interface. For example, the information regarding the applications, the tools, and/or the AI assets may include descriptions, functions, functionalities, recommended computational requirements, recommended computing resources, preferences for computing resources associated with cloud providers, preferences for computing resources associated with on premises resources, and/or the like for the applications, the tools, and/or the AI assets. The provisioning platform may generate the computing resource data using the information regarding the applications, the tools, and/or the AI assets.

In some implementations, the provisioning platform may store, in the template data structure, the computing resource data as part of the customized template data.

Figure 1E:
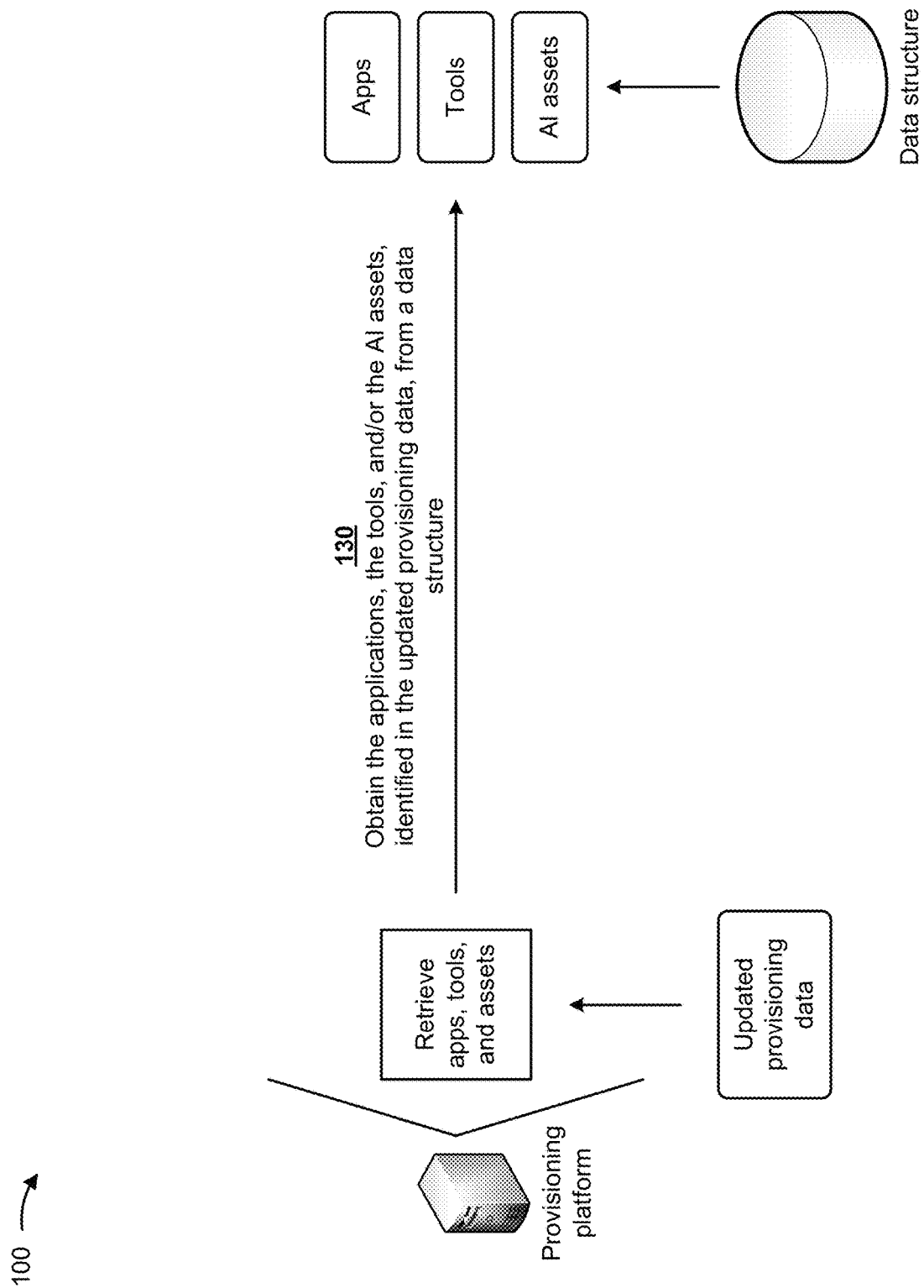

As shown in FIG. 1E, and by reference number 130, the provisioning platform may obtain the applications, the tools, and/or the AI assets, identified in the updated provisioning data, from a data structure, such as, for example, an execution data structure (e.g., a data structure). The execution data structure may be a data structure that stores data regarding multiple applications, tools, and/or AI assets. For example, the data regarding the multiple applications, tools, and/or AI assets may include information identifying each of the multiple applications, tools, and AI assets and execution data that may be used to execute a corresponding one of the multiple applications, tools, and/or AI assets. The information identifying each of the multiple applications, tools, and/or AI assets may include a respective identifier, a respective description, a respective link, and/or the like for each of the multiple applications, tools, and/or AI assets. The updated provisioning data may include information identifying each of the applications, the tools, and/or the AI assets to be used for the customized platform. The information identifying each of the applications, the tools, and/or the AI assets may include a respective identifier, a respective description, and/or the like for each of the applications, the tools, and/or the AI assets. Accordingly, the provisioning platform may obtain, from the execution data structure, the execution data for the applications, the tools, and/or the AI assets using the information identifying the applications, the tools, and/or the AI assets (included in the updated provisioning data).

In some implementations, the data regarding the multiple applications, tools, and/or AI assets may be stored in different data structures. For example, the data regarding the applications may be stored in a first data structure, the data regarding the tools may be stored in a second data structure, the data regarding the AI assets may be stored in a third data structure, and/or the like. By using different data structures for the multiple applications, tools, and/or AI assets conserves computer resources associated with accessing the multiple applications, tools, and/or AI assets by increasing the efficiency of searching for particular applications, tools, and/or AI assets.

In some implementations, the provisioning platform may store the execution data, in the template data structure (discussed above), as part of the customized template data. Accordingly, when generating the customized template, the provisioning platform may obtain data to generate the customized template from the template data structure as opposed to from multiple additional data structures, thereby preserving computer resources utilized when generating the customized template. In some implementations, the applications, the tools, and/or the AI assets may be used for execution of multiple customized templates.

Figure 1F:
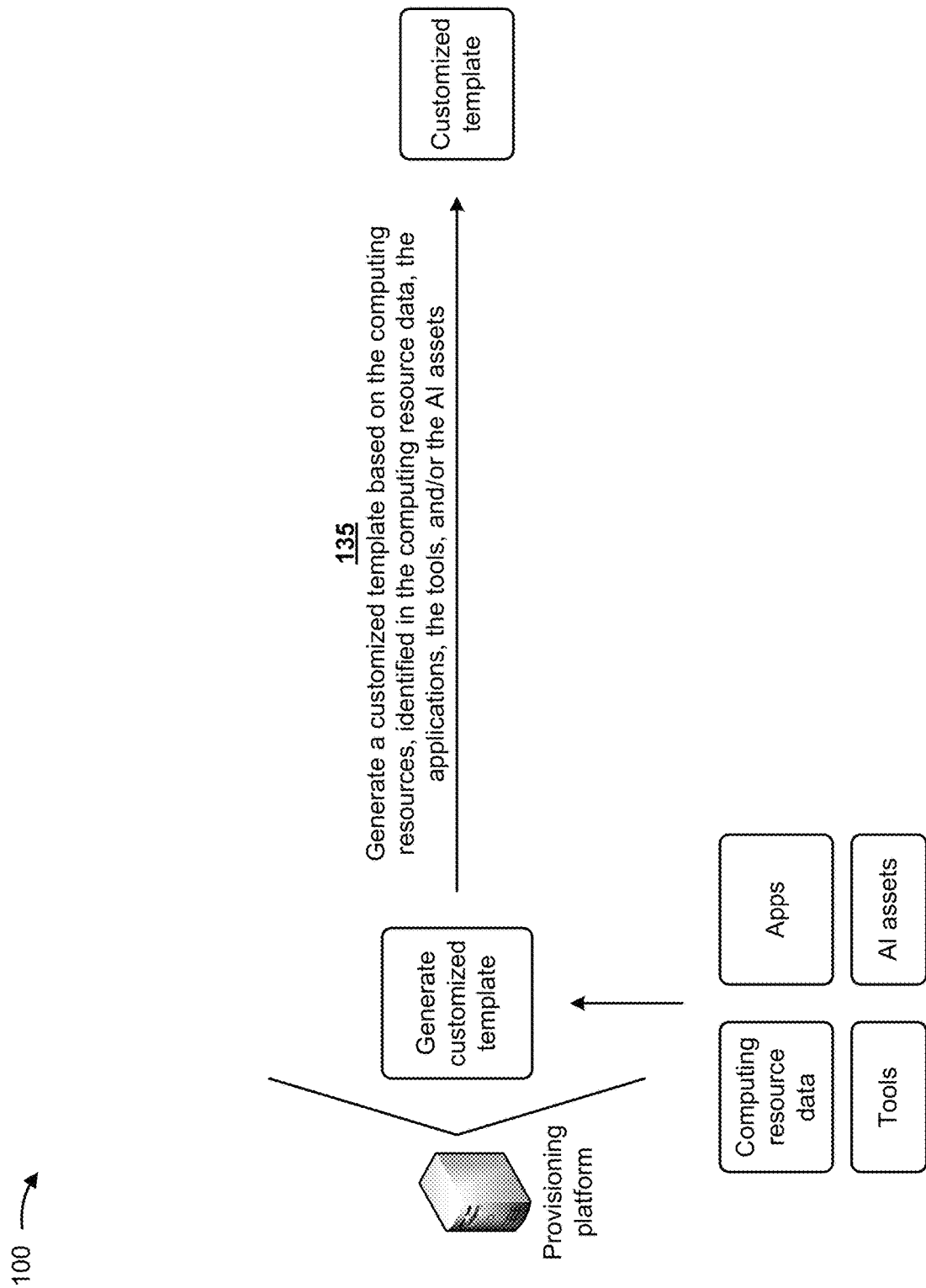

As shown in FIG. 1F, and by reference number 135, the provisioning platform may generate a customized template based on the computing resources, identified in the computing resource data, and the applications, the tools, and/or the AI assets. In some implementations, the provisioning platform may provide, to the client device, information identifying the computing resources, the applications, the tools, and/or the AI assets along with information indicating an option to generate the customized template based on the computing resources and based on the applications, the tools, and/or the AI assets. For example, the option may be provided as a selectable item. In this regard, the provisioning platform may receive, from the client device, information indicating a selection of the selectable item representing the option along with information identifying the user. Accordingly, the provisioning platform may obtain, from the template data structure, the customized template data using the information identifying the user and based on receiving the information indicating the selection.

In some implementations, the customized template may include a file (e.g. an executable file, a text file, an application file, and/or some other computer file or document) that may be executed (or otherwise processed) to cause the computing resources to be provisioned (e.g., allocated or created) and cause the applications, the tools, and/or the AI assets to be executed (e.g., using the computing resources). For example, the customized template may include the computing resources data, the execution data (discussed above), and information identifying a sequence for executing the applications (using the execution data of the applications), executing the tools (using the execution data of the tools), executing the AI assets (using the execution data of the AI assets), and provisioning the computing resources (using the computing resource data).

Additionally, or alternatively, the customized template may include data that may be executed to determine an availability of the computing resources and actions to be taken based on the availability of the computing resources, as discussed in more detail below. Additionally, or alternatively, the customized template may include data that may be executed to cause the applications to be executed in a container, as discussed in more detail below.

Additionally, or alternatively, the customized template may include data that may be executed to cause a key pair (or a pair of cryptographic keys) to be generated (e.g., using one or more cryptographic protocols). The key pair may be used to access a bastion host which may be used during execution of the customized template, as discussed in more detail below. The bastion host may include one or more devices, connected to a network, that perform network security functions during execution of the customized template and/or during provisioning of the customized platform. The bastion host may be remote with respect to the provisioning platform.

Figure 1G:
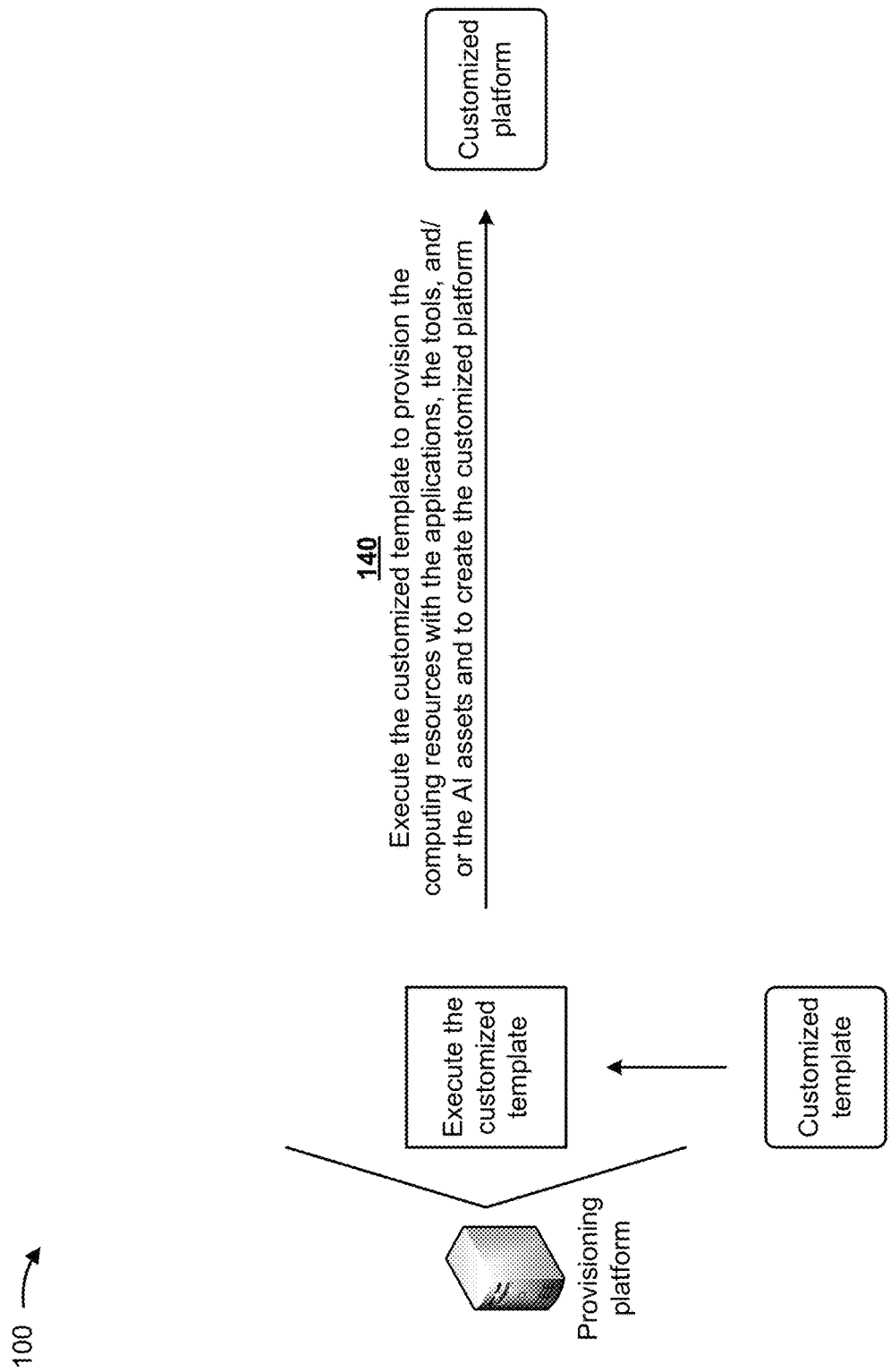

As shown in FIG. 1G, and by reference number 140, the provisioning platform may execute the customized template to provision the computing resources with the applications, the tools, and/or the AI assets and to create the customized platform. In some implementations, the provisioning platform may execute the customized template based on a single input from the user via the client device (e.g., the information indicating the selection of the option to generate the customized template). Accordingly, the user interface (of the provisioning platform) may provide a "one-click" solution for provisioning the computing resources with the applications, the tools, and/or the AI assets and for creating the customized platform in a timely manner (e.g., within a few hours, such as within 2 hours). This may conserve computing resources, networking resources, human resources, resources costs (as discussed herein), and/or the like that would otherwise be required by users to manually set up platforms (e.g., by identifying required tools and/or computing resources) and create the customized platform.

When executing the customized template, the provisioning platform may set up the infrastructure, set up the type of PaaS, execute the applications (using the execution data of the applications), execute the tools (using the execution data of the tools), execute the AI assets (using the execution data of the AI assets), and/or provision the computing resources (using the computing resource data) in accordance with the sequence identified in the customized template.

In some implementations, the execution of the customized template may be infrastructure as code and, accordingly, the execution of the customized template may cause the computing resources to be provisioned. For example, the customized template may include data regarding software modules associated with the computing resources. Accordingly, when executing the customized template, the provisioning platform may execute the software modules (e.g., in a sequence) to automatically provision the computing resources. Additionally, any dependent computing resource may be created in a respective computing resource (e.g., associated with the cloud provider or the on premise resources). In some implementations, the provisioning platform may communicate with the computing resources to determine whether the computing resources are available to be used for execution of the applications, the tools, and/or the AI assets identified in the updated provisioning data. For example, the provisioning platform may transmit a message to a computing resource to determine whether the computing resource is available and receive a response, from the computing resource, including information indicating whether the computing resource is available.

For example, the information, included in the response, may indicate whether the computing resource is to be used (e.g., for execution of one or more other applications, tools, and/or AI assets). Additionally, or alternatively, the information, included in the response, may indicate whether the computing resource has satisfied a resource limit. For example, the resource limit may indicate a threshold quantity of applications, tools, and/or AI assets whose execution the computing resource may be used for. In some implementations, if one of the computing resources (generated for provisioning of the customized platform) is not available, then the provisioning platform may cause all of the computing resources (generated for provisioning the customized platform) to be removed. In some implementations, if one of the computing resources (generated for provisioning of the customized platform) is not available, then the provisioning platform may replace that computing resource with another computing resource to be used for the customized platform. Alternatively, if one of the computing resources (generated for provisioning of the customized platform) is not available, then the provisioning platform may provide a notification (e.g., email and/or text message), to the user via the user interface, indicating that the computing resource is not available. The notification may include information identifying the computing resource and information indicating that the provisioning of the customized platform may be suspended until the computer resource becomes available.

In some implementations, as part of determining the computing resource data identifying the computing resources (as discussed above in connection with FIG. 1D), the provisioning platform may reserve the computing resources for execution of the applications, the tools, and/or the AI assets. For example, the provisioning platform may transmit a request (e.g., to one or more devices associated with the cloud provider and/or the on premises resources) to reserve the computing resources. The request may include information identifying the computing resources and information identifying a period of time during which the computing resources are to be reserved. The period of time may be based on a maximum amount of time that is typically required to implement (or provision) the customized platform. For example, the period of time may be equal to or exceed the maximum amount of time. The provisioning platform may determine the maximum amount of time based on historical data regarding amounts of time used to implement (or provision) customized platforms associated with the applications, the tools, and/or the AI assets (identified in the updated provisioning data). In response to transmitting the request, the computing resources may be reserved during the period of time (for execution of the applications, the tools, and/or the AI assets to implement the customized platform). After the period of the time and if not used for the customized platform, the computing resources may become available for use with one or more other customized platforms. Accordingly, by transmitting the request to cause the computing resources to be reserved, the provisioning platform may optimize use of the computing resources by ensuring that the computing resources are available for execution of the applications, the tools, and/or the AI assets to implement the customized platform and by freeing the computing resources to be used for another customized platform if not used for the customized platform.

In some implementations, the provisioning platform may provide, to the user of the client device, notifications indicating a status of provisioning the computing resources. The provisioning platform may transmit the notifications to the client device for display via the user interface. Additionally, or alternatively, the provisioning platform may transmit the notifications to the user via different messaging methods including, for example, email or text message. As an example, the notifications may indicate whether the provisioning is in progress, whether the provisioning has been successfully completed, whether the provisioning has failed, an availability of each computing resource, and/or the like. The provisioning platform may transmit similar notifications regarding a status of executing the applications, a status of executing the tools, a status of executing the AI assets, and/or a status of creating the customized platform in a manner similar to the manner described above.

In some implementations, when executing the customized template, the provisioning platform may generate a container and may execute the customized template, via the container, to provision the computing resources with the applications, the tools, and/or the AI assets and to create the customized platform. Containers are described in more detail below with respect to FIG. 4. The provisioning platform may obtain a container image, from a container image repository, and generate the container using the container image. Containers may be used to isolate provisioning of each customized platform for each user of a plurality of users. In this regard, the provisioning platform may enable simultaneous provisioning of customized platforms for multiple users by using containers. For example, the provisioning platform may enable a same application to be provisioned simultaneously for multiple users by executing customized templates via containers. As an example, each provisioning may cause a new container to be created. The provisioning platform may enable an application to be deployed via multiple cloud provider resources and/or on premise resources.

In some implementations, when executing the customized template, the key pair may be generated (e.g., using one or more cryptographic protocols). The provisioning platform may use the key pair to access the bastion host. In this regard, the provisioning platform may cause the customized template to be executed via the bastion host. For example, execution of the customized template via the bastion host may cause the computing resources to be provisioned in a private subnet. Additionally, or alternatively, execution of the customized template via the bastion host may cause secrets (e.g., cryptographic keys) and Secure Sockets Layer certificates to be generated for communications with and/or among the applications, the tools, and the AI assets. Additionally, or alternatively, execution of the customized template via the bastion host may permit scaling of memory and processing resources associated with the load (e.g., a quantity of users accessing the customized platform) and execution of the applications, the tools, and the AI assets in the customized platform. Additionally, or alternatively, execution of the customized template via the bastion host may permit the execution of wrapper modules. The execution of wrapper modules may generate secrets used to access the container image repository discussed above (e.g., docker registry and/or source code management (SCM)). The generated secrets may be used to access the docker registry and/or SCM in order to access the tools of the customized platform. Additionally, when executing the customized template, the provisioning platform may cause customized platform credentials (e.g., a username, a password, a passcode, a biometric, and/or the like of the user) to be generated. The customized platform credentials may be used to access the customized platform and may be stored in a platform credentials data structure (e.g., a secured folder) in association with the information identifying the customized platform, the user, the client, the one or more other users, and/or the one or more other client devices.

Additionally, or alternatively, the provisioning platform may cause an application program interface (API) to be called to generate and provide a user interface of the customized platform (e.g., to the client device). In some implementations, the provisioning platform may store the provisioning data and/or the updated provision data (e.g., information regarding the applications, tools, and/or the like) in a data structure associated with the customized platform. Additionally, during the remote execution, the real-time status (including any updates) of the provisioning of the customized platform may be provided via the user interface (provided by the provisioning platform to the client device). Additionally, the provisioning platform may provide a notification (e.g., email and/or text message), to the user via the user interface, regarding the real-time status along with the customized platform credentials.

In some implementations, when executing the customized template, an instance of the bastion host (or a bastion instance) may be generated. In this regard, when causing the customized template to be executed via the bastion host, the provisioning platform may cause the customized template to be executed via the bastion instance. In some implementations, the provisioning platform may cause the bastion host to generate passwords for internal communications among the applications, the tools, and the AI assets of the customized platform. By generating the passwords for internal communications, the provisioning platform may conserve computing resources, networking resources, and/or the like that have would otherwise have been used by each of the applications, the tools, and the AI assets to generate passwords As shown in FIG. 1H, and by reference number 145, the provisioning platform may perform one or more actions based on creating the customized platform. The one or more actions may include enabling the user of the client device to access the customized platform via the client device and based on the customized platform credentials. For example, the provisioning platform (and/or the customized platform) may receive, from the client device, the customized platform credentials and the information identifying the customized platform, the user and/or the client device (discussed above). The provisioning platform (and/or the customized platform) may obtain, from the platform credentials data structure and using the information identifying the customized platform, the user, and/or the client device, the stored customized platform credentials. The provisioning platform (and/or the customized platform) may compare the received customized platform credentials to the stored customized platform credentials and may enable access to the customized platform, if the received customized platform credentials match the stored customized platform credentials. In some implementations, access to the customized platform may be enabled using a two-tier security service, thereby securing the customized platform.

The one or more actions may include the provisioning platform enabling other users to access the customized platform via other client devices and based on the customized platform credentials. For example, the provisioning platform (and/or the customized platform) may receive the customized platform credentials from the other client devices; may obtain, from the platform credentials data structure and using the information identifying the customized platform, the other users and/or the other client devices (discussed above), the stored customized platform credentials; and enable access to the customized platform, if the received customized platform credentials match the customized platform credentials stored in the platform credentials data structure, in a manner similar to the manner described above.

The one or more actions may include the provisioning platform storing data associated with the customized platform in a data structure. For example, the provisioning platform may store the data associated with the customized platform in a platform backup data structure to implement a backup mechanism for the customized platform. The data associated with the customized platform may include and/or correspond to the customized template data. In this regard, the data associated with the customized platform (stored in the platform backup data structure) may be used to restore the customized platform in the event of a failure of the customized platform, thereby conserving computing resources, network resources, and/or the like that would have been used for the entire process of generating the customized template data and/or provisioning the customized platform (as described in FIGS. 1A-1G). Similarly, in the event of a failure and/or a deletion of one or more of the tools of the customized platform, the data associated with the customized platform (stored in the platform backup data structure) may be used to restore the one or more tools.

In some implementations, the provisioning platform may receive, from the client device, an instruction (e.g., a single input on a user interface) to delete the customized platform, and remove the infrastructure, the applications, tools, and/or AI assets from the computing resources based on the instruction and to delete the customized platform. Using a single input (e.g., to delete the customized platform, update the customized platform, and/or the like) may conserve computing resources, network resources, and/or the like that would have been used during a more cumbersome process for deleting the customized platform, updating the customized platform, and/or the like. For example, the provisioning platform may delete information regarding the applications, tools, and/or AI assets from one or more memories associated with the computing resources. Accordingly, the computing resources may no longer be allocated for execution of the applications, tools, and/or AI assets. The provisioning platform may provide, to the client device, a notification indicating that the customized platform is deleted (e.g., based on deleting the information). The provisioning platform may maintain the data associated with the customized platform stored in the platform backup data structure, for a threshold amount of time following receipt of the instruction to delete the customized platform, to enable the customized platform to be restored (e.g., within the threshold amount of time) in the event the client device accidentally or unintentionally transmits an instruction to delete the customized platform. Maintaining the data associated with the customized platform in the platform backup data structure may conserve computing resources, network resources, and/or the like that would have been used for the entire process of provisioning the customized platform (as described in FIGS. 1A-1G).

In some implementations, the provisioning platform may receive an indication that the customized platform has been deleted (e.g., after deleting the information, as discussed above). After receiving the indication, the provisioning platform may receive, from the client device, a request to restore the customized platform, and may restore the customized platform using the data associated with the customized platform (stored in the platform backup data structure). In other words, the data associated with the customized platform may be used to restore the customized platform based on the indication that the customized platform has been deleted.

In some implementations, the provisioning platform may receive, from the client device, data identifying an update to the customized platform, and update the customized platform based on the data identifying the update. For example, the provisioning platform may receive, from the client device, a request to update the customized platform and may provide to the client device (e.g., via an updated user interface) information regarding one or more customized platforms (including the customized platform) provisioned for the user. The information regarding the one or more customized platforms may include information identifying each customized platform, information identifying each corresponding application, tool, AI asset, and computing resource, and/or information identifying each corresponding additional or recommended application, tool, AI asset, and computing resource (which may be recommended in a manner similar to the manner discussed herein).

In this regard, the user may update the customized platform by selecting, via the user interface provided by the provisioning platform, information identifying one or more of the applications, tools, AI assets, and/or computing resources for deletion. Additionally, or alternatively, the user may update the customized platform by selecting, via the update user interface, information identifying the customized platform for deletion and, accordingly, information identifying the applications, tools, AI assets, and/or computing resources provisioned for the customized platform. Additionally, or alternatively, the user may update the customized platform by selecting, via the update user interface, information identifying one or more additional applications, tools, AI assets, and/or computing resource to be added to and provisioned for the customized platform. The user may select an option, provided via the update user interface, to confirm the update and the provisioning platform may cause the update to be implemented. In other words, the provisioning platform may provide a "one-click" solution for updating the customized platform.

The provisioning platform may update the data associated with the customize platform, stored in the platform backup data structure, based on the data identifying the update. Accordingly, the data associated with the customized platform may be updated by removing and/or adding information regarding one or more applications, tools, AI assets, and computing resources. The data associated with the customized platform may be updated, in the platform backup data structure, on a regular basis (e.g., multiple times a day, daily, multiple times a week, weekly, etc.). Additionally, or alternatively, the provisioning platform may implement a backup mechanism for the information stored in the credential vault, in a manner similar to that described above for the backup mechanism for the customized platform.

The one or more actions may include the provisioning platform recommending additional applications, tools, and/or AI assets for the customized platform. In some implementations, the provisioning platform may recommend additional applications, tools, and/or AI assets for the customized platform based on the user profile, in a manner similar to the manner described above in connection with FIG. 1A. Additionally, or alternatively, the provisioning platform may recommend the additional applications, tools, and/or AI assets using a recommendation machine learning model (which may be trained in a similar manner as the other machine learning models discussed above). For example, the recommendation machine learning model may be trained with historical data (e.g., historical data identifying applications, tools, and AI assets provisioned for customized platforms, technology trends (e.g., DevOps technology trends, market trends (e.g., DevOps market trends), recommendations for additional applications, tools, and AI assets, and/or the like) to recommend applications, tools, and/or AI assets for customized platforms.

In some implementations, in conjunction with recommending additional applications, tools, and/or AI assets for the customized platform, the provisioning platform may recommend one or more additional computing resources in a manner similar to the manner described above. For example, the provisioning platform may recommend the one or more additional computing resources by monitoring usage of the computing resources by the applications, tools, and/or AI assets, determining that the one or more additional computing resources are needed based on the usage of the computing resources, and recommending the one or more additional computing resources. The provisioning platform may provision the one or more additional computing resources with one or more of the applications, tools, and AI assets.

The one or more actions may include the provisioning platform retraining one or more of the machine learning models discussed above based on creating the customized platform. For example, the provisioning platform may retrain the one or more of the machine learning models with the data associated with the customized platform as part of the historical data. In this way, the provisioning platform may improve the accuracy of the one or more of the machine learning models in identifying conflicting and/or redundant applications, tools, and/or AI assets included in provisioning data; identifying computing resources to be used for execution of applications, tools and/or AI assets; recommending additional applications, tools, and/or AI assets for customized platforms; and/or the like. This, in turn, may improve speed and efficiency of the machine learning model for creating and provisioning customized platforms, and thereby conserve computing resources, networking resources, and/or the like that would have otherwise been used to create and provision customized platforms in a less efficient manner.

The one or more actions identified above are provided merely as examples of actions that can be performed by the provisioning platform. In practice, the provisioning platform may perform a single action identified above, a combination of actions identified above, and/or one or more other actions not identified above.

In this way, several different stages of the process for generating and provisioning a customized platform for selected applications, tools, and artificial intelligence assets are automated, which may remove human subjectivity and waste from the process, and which may improve speed and efficiency of the process and conserve computing resources (e.g., processing resources, memory resources, communication resources, and/or the like), networking resources, human resources, resources costs (as discussed herein), and/or the like. Additionally, implementations described herein may enable multiple ways of provisioning customized platforms and the customized platforms may be associated with multiple DevOps platform technologies. Furthermore, implementations described herein use a rigorous, computerized process to perform tasks or roles that were not previously performed or were previously performed using subjective human intuition or input. For example, currently there does not exist a technique to dynamically generate and provision a customized platform for selected applications, tools, and AI assets in the manner described herein. Finally, the process for automatically generating and provisioning a customized platform for selected applications, tools, and AI assets conserves computing resources, networking resources, and/or the like that have would otherwise have been used to manually process (e.g., identify, install, configure, and/or the like) required infrastructure, applications, tools, and/or the like for a DevOps platform; identify misconfigurations in the DevOps platform, correct the misconfigurations in the DevOps platform, and/or like.

As can be understood from the details herein, customized platforms can be provisioned using different cloud provider resources and/or on premises resources from a single portal (e.g., provided via the user interface) in a timely manner (e.g., within a few hours). Additionally, or alternatively, the provisioning platform may enable a cloud provider or on premise resources, an infrastructure, a type of PaaS, one or more applications, one or more tools, and/or one or more artificial intelligence (AI) assets to be selected based on a single input from a user via the user interface provided to the client device. In other words, the provisioning platform may provide a "one-click" solution for selecting a cloud provider or on premise resources, an infrastructure, a type of PaaS, one or more applications, one or more tools, and/or one or more artificial intelligence (AI) assets. Additionally, or alternatively, the provisioning platform may provide a user with the ability to pay for just services used to implement a customized platform.

As indicated above, FIGS. 1A-1H are provided merely as examples. Other examples may differ from what is described with regard to FIGS. 1A-1H.

Figure 2:
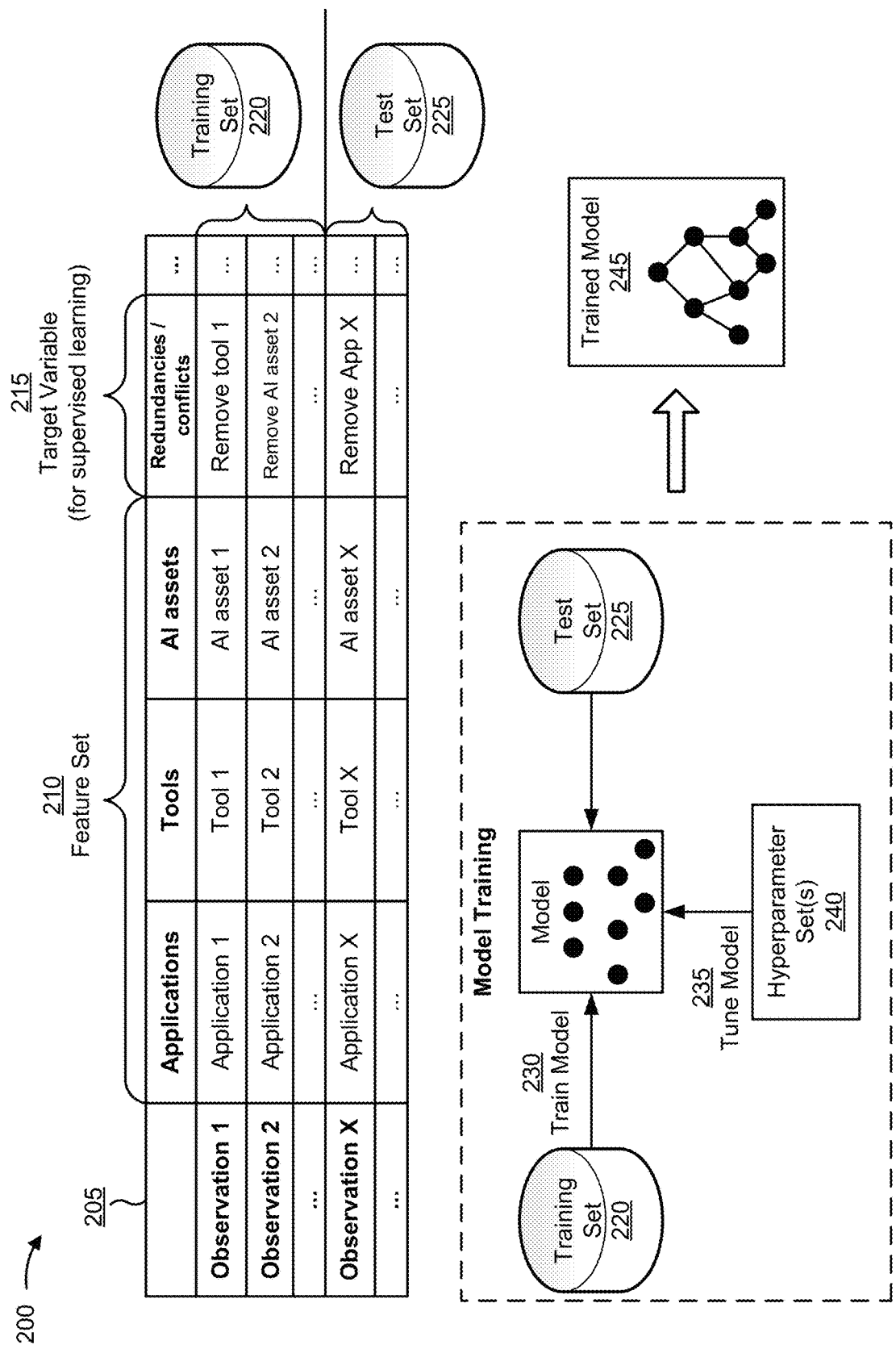
FIG. 2 is a diagram illustrating an example of training a machine learning model.

FIG. 2 is a diagram illustrating an example 200 of training a machine learning model. The machine learning model training described herein may be performed using a machine learning system. The machine learning system may include a computing device, a server, a cloud computing environment, and/or the like, such as the client device and/or the provisioning platform.

As shown by reference number 205, a machine learning model may be trained using a set of observations. The set of observations may be obtained and/or input from historical data, such as data gathered during one or more processes described herein. For example, the set of observations may include data gathered from user interaction with and/or user input to the provisioning platform, as described elsewhere herein. In some implementations, the machine learning system may receive the set of observations (e.g., as input) from the client device.

As shown by reference number 210, a feature set may be derived from the set of observations. The feature set may include a set of variable types. A variable type may be referred to as a feature. A specific observation may include a set of variable values corresponding to the set of variable types. A set of variable values may be specific to an observation. In some cases, different observations may be associated with different sets of variable values, sometimes referred to as feature values. In some implementations, the machine learning system may determine variable values for a specific observation based on input received from the client device. For example, the machine learning system may identify a feature set (e.g., one or more features and/or corresponding feature values) from structured data input to the machine learning system, such as by extracting data from a particular column of a table, extracting data from a particular field of a form, extracting data from a particular field of a message, extracting data received in a structured data format, and/or the like.

In some implementations, the machine learning system may determine features (e.g., variables types) for a feature set based on input received from the client device, such as by extracting or generating a name for a column, extracting or generating a name for a field of a form and/or a message, extracting or generating a name based on a structured data format, and/or the like. Additionally, or alternatively, the machine learning system may receive input from an operator to determine features and/or feature values. In some implementations, the machine learning system may perform natural language processing and/or another feature identification technique to extract features (e.g., variable types) and/or feature values (e.g., variable values) from text (e.g., unstructured data) input to the machine learning system, such as by identifying keywords and/or values associated with those keywords from the text.

As an example, a feature set for a set of observations may include a first feature of applications, a second feature of tools, a third feature of AI assets, and so on. As shown, for a first observation, the first feature may have a value of a first application (e.g., application 1), the second feature may have a value of a first tool (e.g., tool 1), the third feature may have a value of a first AI asset (e.g., AI asset 1), and so on. These features and feature values are provided as examples, and may differ in other examples. For example, the feature set may include one or more of the following features: data identifying applications (e.g., applications to be utilized with the customized platform, such as a customized DevOps platform); tools (e.g., tools to be utilized with the customized platform, such as a customized DevOps platform); AI assets (e.g., AI assets to be utilized with the customized platform, such as a customized DevOps platform); and/or the like. In some implementations, the machine learning system may pre-process and/or perform dimensionality reduction to reduce the feature set and/or combine features of the feature set to a minimum feature set. A machine learning model may be trained on the minimum feature set, thereby conserving resources of the machine learning system (e.g., processing resources, memory, and/or the like) used to train the machine learning model.

As shown by reference number 215, the set of observations may be associated with a target variable type (e.g., redundancies and/or conflicts). The target variable type may represent a variable having a numeric value (e.g., an integer value, a floating point value, and/or the like), may represent a variable having a numeric value that falls within a range of values or has some discrete possible values, may represent a variable that is selectable from one of multiple options (e.g., one of multiples classes, classifications, labels, and/or the like), may represent a variable having a Boolean value (e.g., 0 or 1, True or False, Yes or No), and/or the like. A target variable type may be associated with a target variable value, and a target variable value may be specific to an observation. In some cases, different observations (e.g., different words, phrases, sentences, and/or the like) may be associated with different target variable values.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model, a predictive model, and/or the like. When the target variable type is associated with continuous target variable values (e.g., a range of numbers and/or the like), the machine learning model may employ a regression technique. When the target variable type is associated with categorical target variable values (e.g., classes, labels, and/or the like), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, an automated signal extraction model, and/or the like. In this case, the machine learning model may learn patterns from the set of observations without labeling or supervision, and may provide output that indicates such patterns, such as by using clustering and/or association to identify related groups of items within the set of observations.

As further shown, the machine learning system may partition the set of observations into a training set 220 that includes a first subset of observations, of the set of observations, and a test set 225 that includes a second subset of observations of the set of observations. The training set 220 may be used to train (e.g., fit, tune, and/or the like) the machine learning model, while the test set 225 may be used to evaluate a machine learning model that is trained using the training set 220. For example, for supervised learning, the test set 225 may be used for initial model training using the first subset of observations, and the test set 225 may be used to test whether the trained model accurately predicts target variables in the second subset of observations. In some implementations, the machine learning system may partition the set of observations into the training set 220 and the test set 225 by including a first portion or a first percentage of the set of observations in the training set 220 (e.g., 75%, 80%, or 85%, among other examples) and including a second portion or a second percentage of the set of observations in the test set 225 (e.g., 25%, 20%, or 15%, among other examples). In some implementations, the machine learning system may randomly select observations to be included in the training set 220 and/or the test set 225.

As shown by reference number 230, the machine learning system may train a machine learning model using the training set 220. This training may include executing, by the machine learning system, a machine learning algorithm to determine a set of model parameters based on the training set 220. In some implementations, the machine learning algorithm may include a regression algorithm (e.g., linear regression, logistic regression, and/or the like), which may include a regularized regression algorithm (e.g., Lasso regression, Ridge regression, Elastic-Net regression, and/or the like). Additionally, or alternatively, the machine learning algorithm may include a decision tree algorithm, which may include a tree ensemble algorithm (e.g., generated using bagging and/or boosting), a random forest algorithm, a boosted trees algorithm, and/or the like. A model parameter may include an attribute of a machine learning model that is learned from data input into the model (e.g., the training set 220). For example, for a regression algorithm, a model parameter may include a regression coefficient (e.g., a weight). For a decision tree algorithm, a model parameter may include a decision tree split location, as an example.

As shown by reference number 235, the machine learning system may use one or more hyperparameter sets 240 to tune the machine learning model. A hyperparameter may include a structural parameter that controls execution of a machine learning algorithm by the machine learning system, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the machine learning model to the training set 220. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), may be applied by setting one or more feature values to zero (e.g., for automatic feature selection), and/or the like. Example hyperparameters for a decision tree algorithm include a tree ensemble technique to be applied (e.g., bagging, boosting, a random forest algorithm, a boosted trees algorithm, and/or the like), a number of features to evaluate, a number of observations to use, a maximum depth of each decision tree (e.g., a number of branches permitted for the decision tree), a number of decision trees to include in a random forest algorithm, and/or the like.

To train a machine learning model, the machine learning system may identify a set of machine learning algorithms to be trained (e.g., based on operator input that identifies the one or more machine learning algorithms, based on random selection of a set of machine learning algorithms, and/or the like), and may train the set of machine learning algorithms (e.g., independently for each machine learning algorithm in the set) using the training set 220. The machine learning system may tune each machine learning algorithm using one or more hyperparameter sets 240 (e.g., based on operator input that identifies hyperparameter sets 240 to be used, based on randomly generating hyperparameter values, and/or the like). The machine learning system may train a particular machine learning model using a specific machine learning algorithm and a corresponding hyperparameter set 240. In some implementations, the machine learning system may train multiple machine learning models to generate a set of model parameters for each machine learning model, where each machine learning model corresponds to a different combination of a machine learning algorithm and a hyperparameter set 240 for that machine learning algorithm.

In some implementations, the machine learning system may perform cross-validation when training a machine learning model. Cross-validation can be used to obtain a reliable estimate of machine learning model performance using only the training set 220, and without using the test set 225, such as by splitting the training set 220 into a number of groups (e.g., based on operator input that identifies the number of groups, based on randomly selecting a number of groups, and/or the like) and using those groups to estimate model performance. For example, using k-fold cross-validation, observations in the training set 220 may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group k−1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, a standard error across cross-validation scores, and/or the like.

In some implementations, the machine learning system may perform cross-validation when training a machine learning model by splitting the training set into a number of groups (e.g., based on operator input that identifies the number of groups, based on randomly selecting a number of groups, and/or the like). The machine learning system may perform multiple training procedures and may generate a cross-validation score for each training procedure. The machine learning system may generate an overall cross-validation score for each hyperparameter set 240 associated with a particular machine learning algorithm. The machine learning system may compare the overall cross-validation scores for different hyperparameter sets 240 associated with the particular machine learning algorithm, and may select the hyperparameter set 240 with the best (e.g., highest accuracy, lowest error, closest to a desired threshold, and/or the like) overall cross-validation score for training the machine learning model. The machine learning system may then train the machine learning model using the selected hyperparameter set 240, without cross-validation (e.g., using all data in the training set 220 without any hold-out groups), to generate a single machine learning model for a particular machine learning algorithm. The machine learning system may then test this machine learning model using the test set 225 to generate a performance score, such as a mean squared error (e.g., for regression), a mean absolute error (e.g., for regression), an area under receiver operating characteristic curve (e.g., for classification), and/or the like. If the machine learning model performs adequately (e.g., with a performance score that satisfies a threshold), then the machine learning system may store that machine learning model as a trained machine learning model 245 to be used to analyze new observations, as described below in connection with FIG. 3.

In some implementations, the machine learning system may perform cross-validation, as described above, for multiple machine learning algorithms (e.g., independently), such as a regularized regression algorithm, different types of regularized regression algorithms, a decision tree algorithm, different types of decision tree algorithms, and/or the like. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set 220 (e.g., without cross-validation), and may test each machine learning model using the test set 225 to generate a corresponding performance score for each machine learning model. The machine learning model may compare the performance scores for each machine learning model, and may select the machine learning model with the best (e.g., highest accuracy, lowest error, closest to a desired threshold, and/or the like) performance score as the trained machine learning model 245.

As indicated above, FIG. 2 is provided as an example. Other examples may differ from what is described in connection with FIG. 2. For example, the machine learning model may be trained using a different process than what is described in connection with FIG. 2. Additionally, or alternatively, the machine learning model may employ a different machine learning algorithm than what is described in connection with FIG. 2, such as a Bayesian estimation algorithm, a k-nearest neighbor algorithm, an a priori algorithm, a k-means algorithm, a support vector machine algorithm, a neural network algorithm (e.g., a convolutional neural network algorithm), a deep learning algorithm, and/or the like.

Figure 3:
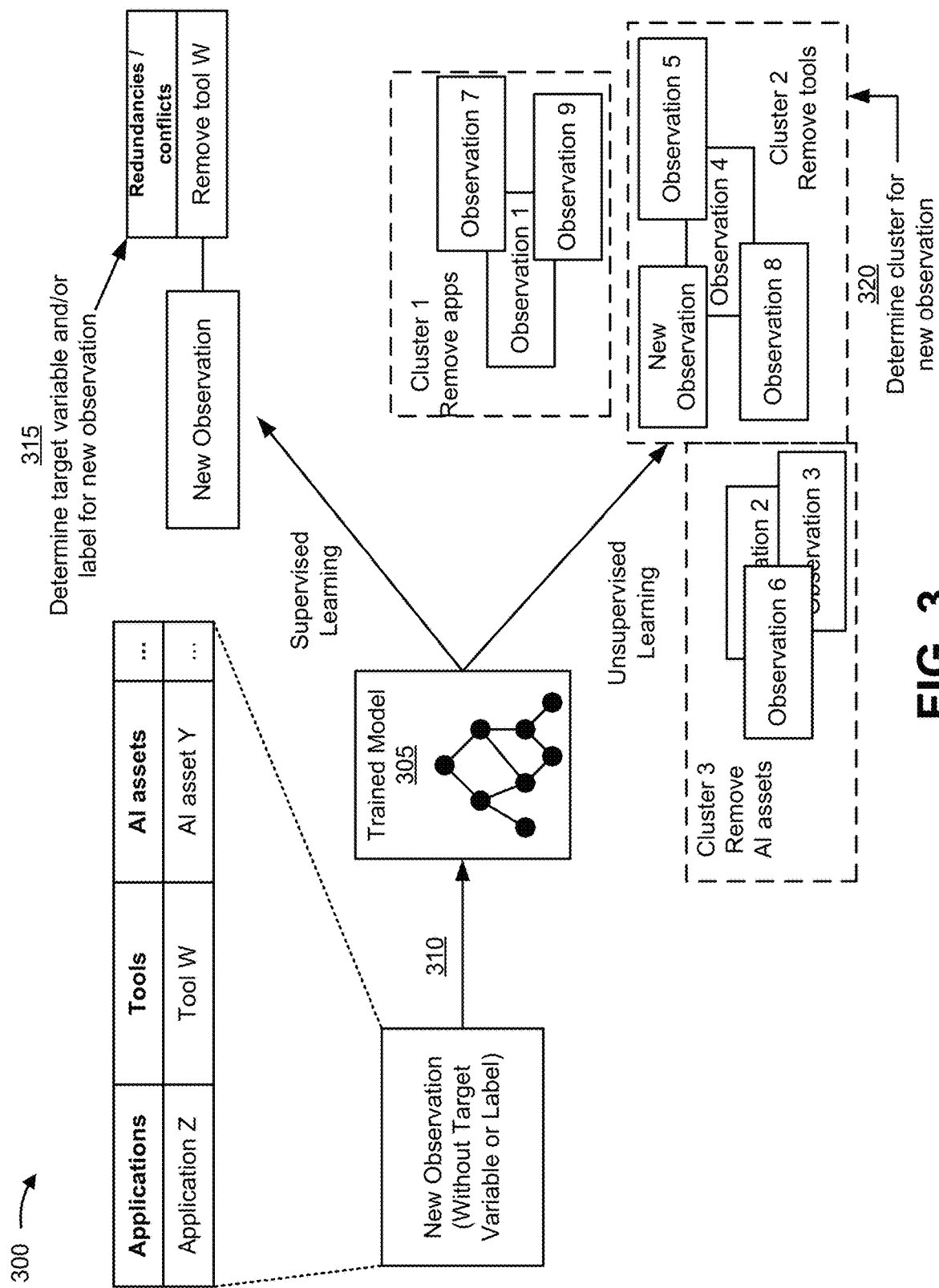
FIG. 3 is a diagram illustrating an example of applying a trained machine learning model to a new observation.

FIG. 3 is a diagram illustrating an example 300 of applying a trained machine learning model to a new observation. The new observation may be input to a machine learning system that stores a trained machine learning model 305. In some implementations, the trained machine learning model 305 may be the trained machine learning model 245 described above in connection with FIG. 2. The machine learning system may include a computing device, a server, a cloud computing environment, and/or the like, such as the provisioning platform.

As shown by reference number 310, the machine learning system may receive a new observation (or a set of new observations), and may input the new observation to the machine learning model 305. As shown, the new observation may include a first feature of applications (e.g., application Z), a second feature of tools (e.g., tool W), a third feature of AI assets (e.g., AI asset Y), and so on, as an example. The machine learning system may apply the trained machine learning model 305 to the new observation to generate an output (e.g., a result). The type of output may depend on the type of machine learning model and/or the type of machine learning task being performed. For example, the output may include a predicted (e.g., estimated) value of a target variable (e.g., a value within a continuous range of values, a discrete value, a label, a class, a classification, and/or the like), such as when supervised learning is employed. Additionally, or alternatively, the output may include information that identifies a cluster to which the new observation belongs, information that indicates a degree of similarity between the new observations and one or more prior observations (e.g., which may have previously been new observations input to the machine learning model and/or observations used to train the machine learning model), and/or the like, such as when unsupervised learning is employed.

In some implementations, the trained machine learning model 305 may predict "remove tool W" for the target variable of redundancies and/or conflicts, as shown by reference number 315. Based on this prediction (e.g., based on the value having a particular label/classification, based on the value satisfying or failing to satisfy a threshold, and/or the like), the machine learning system may provide a recommendation, such as remove tool W since tool W is redundant with application V. Additionally, or alternatively, the machine learning system may perform an automated action and/or may cause an automated action to be performed (e.g., by instructing another device to perform the automated action), such as delete tool W from selected tools. As another example, if the machine learning system were to predict a value of "remove AI asset Y" (e.g., if two or more AI assets have been selected) for the target variable of strings of characters, then the machine learning system may provide a different recommendation (e.g., remove AI asset Y since AI asset Y conflicts with tool W) and/or may perform or cause performance of a different automated action (e.g., delete AI asset Y from selected AI assets). In some implementations, the recommendation and/or the automated action may be based on the target variable value having a particular label (e.g., classification, categorization, and/or the like), may be based on whether the target variable value satisfies one or more thresholds (e.g., whether the target variable value is greater than a threshold, is less than a threshold, is equal to a threshold, falls within a range of threshold values, and/or the like), and/or the like.

In some implementations, the trained machine learning model 305 may classify (e.g. cluster) the new observation in an action cluster, as shown by reference number 320. The observations within a cluster may have a threshold degree of similarity. Based on classifying the new observation in the action cluster, the machine learning system may provide a recommendation, such as remove tool W. Additionally, or alternatively, the machine learning system may perform an automated action and/or may cause an automated action to be performed (e.g., by instructing another device to perform the automated action), such as delete tool W from selected tools. As another example, if the machine learning system were to classify the new observation in another action cluster, then the machine learning system may provide a different recommendation (e.g., remove AI asset Y) and/or may perform or cause performance of a different automated action (e.g., delete AI asset Y from selected AI assets).

In this way, the machine learning system may apply a rigorous and automated process to generate and provision a customized platform for selected applications, tools, and AI assets. The machine learning system enables recognition and/or identification of tens, hundreds, thousands, or millions of features and/or feature values for tens, hundreds, thousands, or millions of observations, thereby increasing an accuracy and consistency of generating and provisioning a customized platform for selected applications, tools, and AI assets relative to requiring computing resources to be allocated for tens, hundreds, or thousands of operators to manually generate and provision a customized platform for selected applications, tools, and AI assets.

As indicated above, FIG. 3 is provided as an example. Other examples may differ from what is described in connection with FIG. 3.

Figure 4:
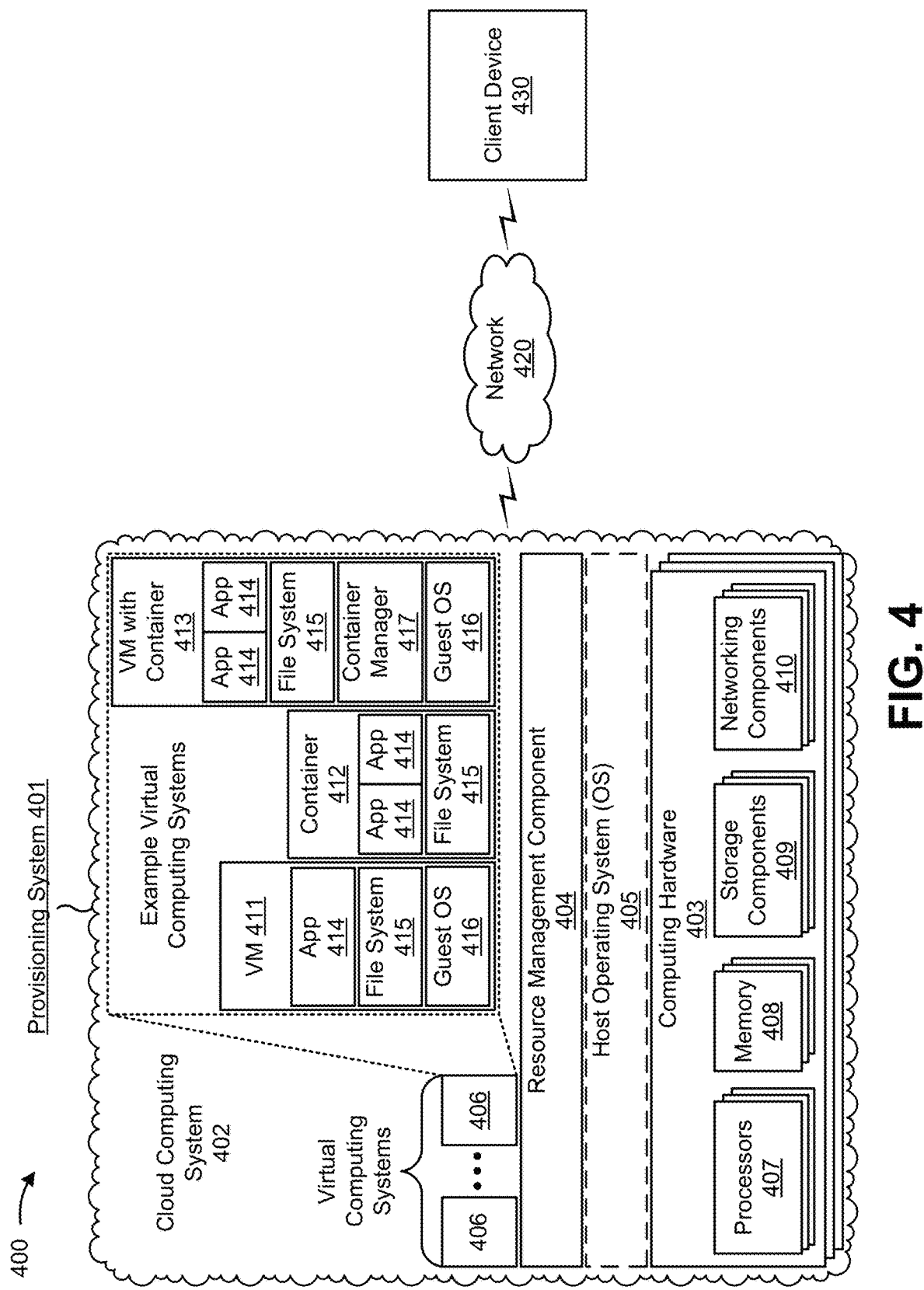
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a provisioning platform 401. The provisioning platform 401 may include one or more elements of a cloud computing system 402 and/or may execute within the cloud computing system 402 (e.g., as one or more virtual computing systems 406). The cloud computing system 402 may include one or more elements 403-417, as described in more detail below. As further shown in FIG. 4, environment 400 may include a network 420 and a client device 430. Devices of environment 400 may interconnect via wired connections, wireless connections, or a combination of wired and wireless connections.

The cloud computing system 402 includes computing hardware 403, a resource management component 404, a host operating system (OS) 405, and/or one or more virtual computing systems 406. The resource management component 404 may perform virtualization (e.g., abstraction) of computing hardware 403 to create the one or more virtual computing systems 406. Using such virtualization, the resource management component 404 enables a single computing device (e.g., a computer, a server, a host device, and/or the like) to operate as if the single computing device were multiple computing devices, such as by creating multiple isolated virtual computing systems 406 from computing hardware 403 of the single computing device. The multiple virtual computing systems 406 operate independently from one another and do not interact with one another. In this way, computing hardware 403 can operate more efficiently, with lower power consumption, higher reliability, higher availability, higher utilization, greater flexibility, and lower cost than using separate computing devices.

Computing hardware 403 includes hardware and corresponding resources from one or more computing devices. For example, computing hardware 403 may include hardware from a single computing device (e.g., a single server or host device) or from multiple computing devices (e.g., multiple servers or host devices), such as multiple computing devices in one or more data centers, server farms, server pools, and/or the like. As shown, computing hardware 403 may include one or more processors 407, one or more memories 408, one or more storage components 409, and/or one or more networking components 410. Computing hardware 403 may be interconnected via one or more wired and/or wireless buses, which may interconnect computing hardware 403 within a single computing device and/or across multiple computing devices.

A processor 407 includes a central processing unit, a graphics processing unit, and/or the like. A memory 408 includes random access memory, read-only memory, and/or the like. The memory 408 may store a set of instructions (e.g., one or more instructions) for execution by the processor 407. The processor 407 may execute the set of instructions to perform one or more operations or processes described herein. In some implementations, execution of the set of instructions, by one or more processors 407, causes the one or more processors 407 and/or the provisioning platform 401 to perform one or more operations or processes described herein. A storage component 409 includes a hard disk or another type of storage device that stores information, data, and/or software (e.g., code, instructions, and/or the like) related to the operation and use of the provisioning platform 401. In some implementations, memory 408 and/or storage component 409 is/are implemented as a non-transitory computer readable medium. A networking component 410 includes a network interface and corresponding hardware that enables the provisioning platform 401 to communicate with other devices of environment 400 via a wired connection and/or a wireless connection, such as via network 420. Additional examples of a processor, a memory, a storage component, and a networking component (e.g., a communication interface) are described elsewhere herein.

The resource management component 404 includes a virtualization application (e.g., executing on hardware, such as computing hardware 403) capable of virtualizing computing hardware 403 to start (e.g., create or spin up), stop (e.g., delete or tear down), and/or manage one or more virtual computing systems 406. Such virtualization may include operating system virtualization, shared kernel virtualization (e.g., container-based virtualization), kernel level virtualization, hypervisor virtualization, paravirtualization, full virtualization, hardware virtualization, and/or the like. The resource management component 404 may control access to and/or use of computing hardware 403 and/or software executing on computing hardware 403. Additionally, or alternatively, the resource management component 404 may perform binary rewriting to scan instructions received from a virtual computing system 406 and replace any privileged instructions with safe emulations of those instructions. The resource management component 404 may include a hypervisor or a virtual machine monitor, such as when the virtual computing systems 406 are virtual machines 411. Additionally, or alternatively, the resource management component 404 may include a container manager, such as when the virtual computing systems 406 are containers 412.

In some implementations, the resource management component 404 executes within and/or in coordination with a host operating system 405. For example, the resource management component 404 may execute on top of the host operating system 405 rather than interacting directly with computing hardware 403, such as when the resource management component 404 is a hosted hypervisor (e.g., a Type 2 hypervisor) or a container manager. In this case, the host operating system 405 may control access to and/or use of computing hardware 403 and/or software executing on computing hardware 403 based on information and/or instructions received from the resource management component 404. Alternatively, the resource management component 404 may interact directly with computing hardware 403 rather than interacting with the host operating system 405, such as when the resource management component 404 is a bare-metal hypervisor (e.g., a Type 1 hypervisor). Thus, in some implementations, the cloud computing system 402 does not include a host operating system 405. In some implementations, the host operating system 405 includes and/or executes an administrator application to enable a system administrator to manage, customize, and/or configure cloud computing system 402.

A virtual computing system 406 includes a virtual environment that enables cloud-based execution of operations and/or processes described herein using computing hardware 403. As shown, a virtual computing system 406 may include a virtual machine 411, a container 412, a hybrid environment 413 that includes a virtual machine and a container, and/or the like. A virtual computing system 406 may execute one or more applications 414 using a file system 415. The file system 415 may include binary files, software libraries, and/or other resources required to execute applications 414 on a guest operating system 416 or the host operating system 405. In some implementations, a virtual computing system 406 (e.g., a virtual machine 411 or a hybrid environment 413) includes a guest operating system 416. In some implementations, a virtual computing system 406 (e.g., a container 412 or a hybrid environment 413) includes a container manager 417.

A virtual machine 411 is an emulation of a computing device that enables execution of separate, isolated instances of virtual computing devices (e.g., multiple virtual machines 411) on the same computing hardware 403. The guest operating systems 416 and applications 414 of multiple virtual machines 411 may share computing hardware 403 from a single computing device or from multiple computing devices (e.g., a pool of computing devices). Each separate virtual machine 411 may include a guest operating system 416, a file system 415, and one or more applications 414. With a virtual machine 411, the underlying computing hardware 403 is virtualized, and the guest operating system 416 executes on top of this virtualized hardware. Using virtual machines 411 enables different types of guest operating systems 416 to execute on the same computing hardware 403 in an isolated environment, but with more resource usage and overhead than containers 412.

Unlike a virtual machine 411, a container 412 virtualizes a host operating system 405 rather than the underlying computing hardware 403. Thus, a container 412 does not require a guest operating system 416 because the application(s) 414 included in the container 412 execute directly on the host operating system 405 using a file system 415 included in the container 412. Each separate container 412 may share the kernel of the host operating system 405, and different applications 414 within a single container 412 may share a file system 415. This sharing of a file system 415 among multiple applications 414 reduces the need to reproduce operating system code for different applications, and enables a single host operating system 405 to execute multiple applications 414 and/or containers 412. As a result, containers 412 enable a greater quantity of applications 414 to execute on a smaller quantity of computing devices as compared to virtual machines 411.

A hybrid environment 413 includes elements of a virtual machine 411 and a container 412. For example, a hybrid environment 413 may include a guest operating system 416 that executes on top of virtualized hardware. A container manager 417 may execute on top of the guest operating system 416 to start, stop, and/or manage one or more containers within the hybrid environment 413. Using a hybrid environment 413 enables different types of guest operating systems 416 to execute on the same computing hardware 403 in an isolated environment, while also enabling lightweight containers to execute on top of the guest operating system 416.

The quantity of applications 414 shown in FIG. 4 as executing within each virtual computing system 406 is shown as an example, and a different quantity of applications 414 may execute within each virtual computing system. Furthermore, although the provisioning platform 401 may include one or more elements 403-417 of the cloud computing system 402, may execute within the cloud computing system 402, and/or may be hosted within the cloud computing system 403, in some implementations, the provisioning platform 401 may not be cloud-based (e.g., may be implemented outside of a cloud computing system) or may be partially cloud-based. For example, the provisioning platform 401 may include one or more devices that are not part of the cloud computing system 402, such as device 500 of FIG. 5, which may include a standalone server or another type of computing device. The provisioning platform 401 may perform one or more operations and/or processes described in more detail elsewhere herein.

Network 420 includes one or more wired and/or wireless networks. For example, network 420 may include a cellular network (e.g., a fifth generation (5G) network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks. The network 420 enables communication among the devices of environment 400.

Client device 430 includes one or more devices capable of receiving, generating, storing, processing, and/or providing information, such as information described herein. For example, client device 430 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), or a similar type of device. In some implementations, client device 430 may receive information from and/or transmit information to provisioning platform 401.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
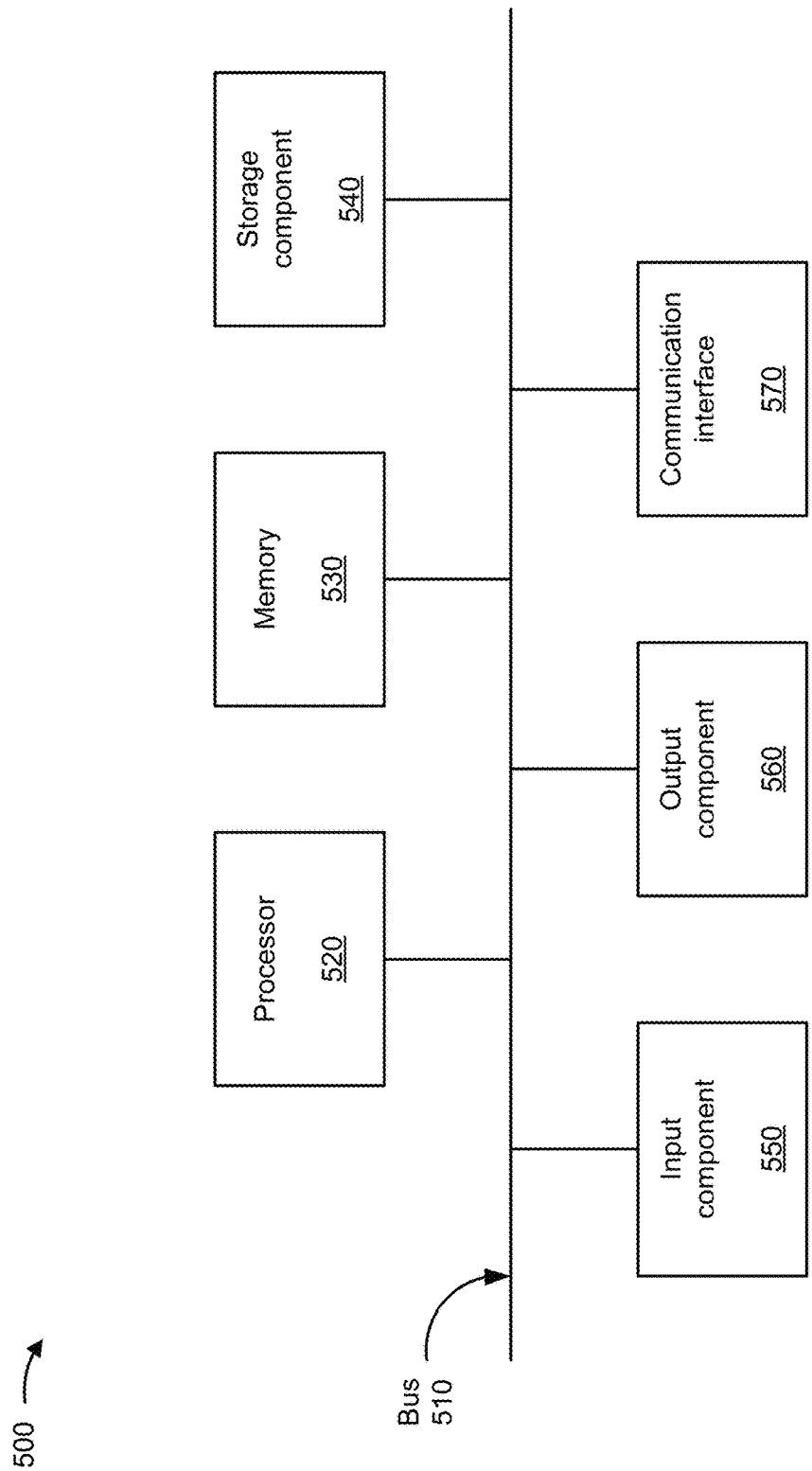
FIG. 5 is a diagram of example components of one or more devices of FIG. 4.

FIG. 5 is a diagram of example components of a device 500. Device 500 may correspond to provisioning platform 401 and/or client device 430. In some implementations, provisioning platform 401 and/or client device 430 may include one or more devices 500 and/or one or more components of device 500. As shown in FIG. 5, device 500 may include a bus 510, a processor 520, a memory 530, a storage component 540, an input component 550, an output component 560, and a communication interface 570.

Bus 510 includes a component that permits communication among the components of device 500. Processor 520 is implemented in hardware, firmware, or a combination of hardware and software. Processor 520 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random-access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 550 includes a component that permits device 500 to receive information, such as via user input (e.g., a touch screen display, a keyboard, a keypad, a mouse, a button, a switch, and/or a microphone). Additionally, or alternatively, input component 550 may include a sensor for sensing information (e.g., a global positioning system (GPS) component, an accelerometer, a gyroscope, and/or an actuator). Output component 560 includes a component that provides output information from device 500 (e.g., a display, a speaker, and/or one or more light-emitting diodes (LEDs)).

Communication interface 570 includes a transceiver-like component (e.g., a transceiver and/or a separate receiver and transmitter) that enables device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, a radio frequency (RF) interface, a universal serial bus (USB) interface, a Wi-Fi interface, a cellular network interface, and/or the like.

Device 500 may perform one or more processes described herein. Device 500 may perform these processes based on processor 520 executing software instructions stored by a non-transitory computer-readable medium, such as memory 530 and/or storage component 540. A computer-readable medium is defined herein as a non-transitory memory device. A memory device includes memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
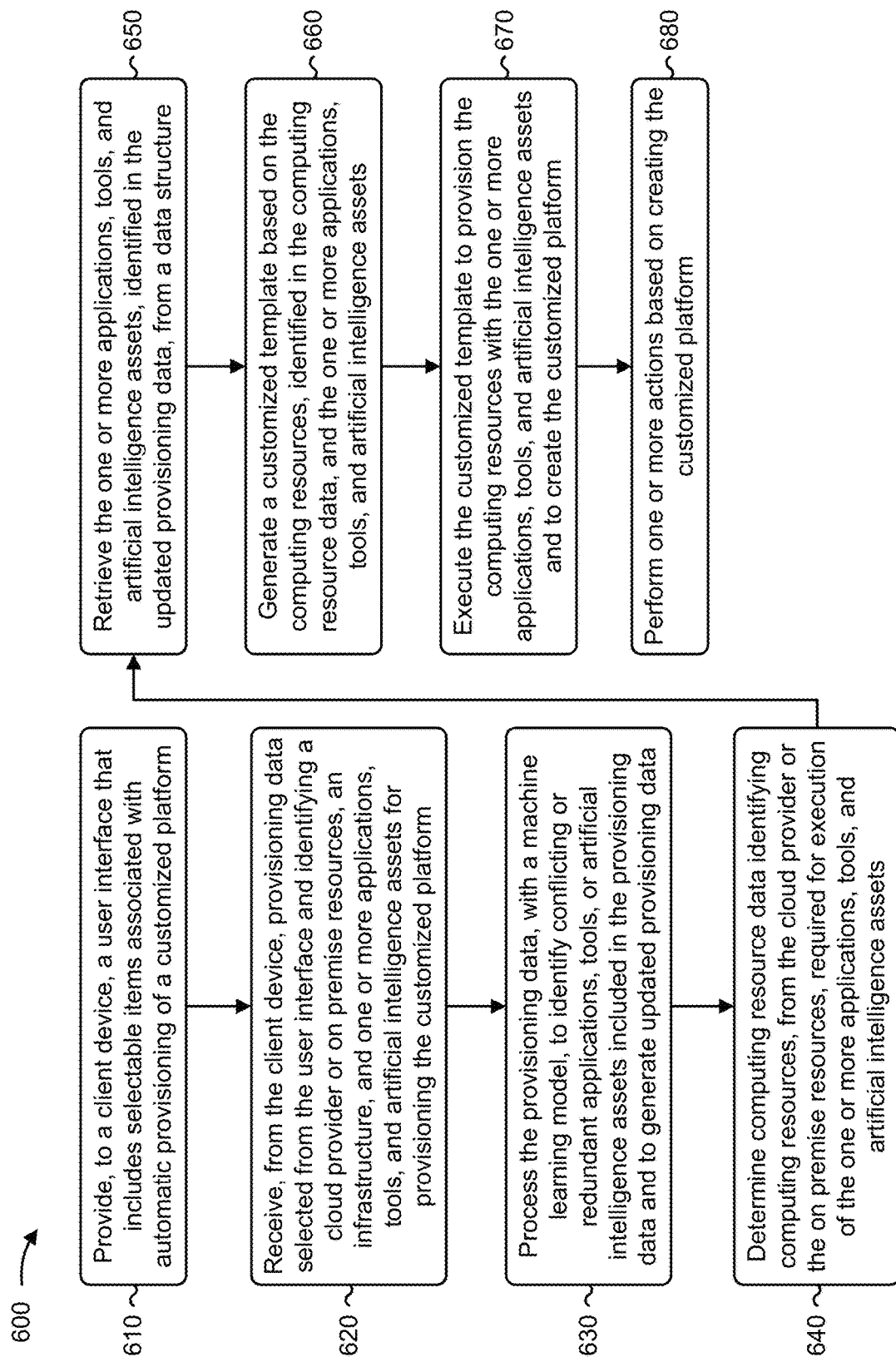
FIGS. 6-8 are flow charts of example processes for automatically generating and provisioning a customized platform for selected applications, tools, and artificial intelligence assets.

FIG. 6 is a flow chart of an example process 600 for automatically generating and provisioning a customized platform for selected applications, tools, and artificial intelligence assets. In some implementations, one or more process blocks of FIG. 6 may be performed by a device (e.g., provisioning platform 401). In some implementations, one or more process blocks of FIG. 6 may be performed by another device or a group of devices separate from or including the device, such as a client device (e.g., client device 430).

As shown in FIG. 6, process 600 may include providing, to a client device, a user interface that includes selectable items associated with automatic provisioning of a customized platform (block 610). For example, the device (e.g., using virtual computing system 406, processor 520, communication interface 570, and/or the like) may provide, to a client device, a user interface that includes selectable items associated with automatic provisioning of a customized platform, as described above.

As further shown in FIG. 6, process 600 may include receiving, from the client device, provisioning data selected from the user interface and identifying a cloud provider or on premise resources, an infrastructure, and one or more applications, tools, and artificial intelligence assets for provisioning the customized platform (block 620). For example, the device (e.g., using virtual computing system 406, processor 520, memory 530, communication interface 570, and/or the like) may receive, from the client device, provisioning data selected from the user interface and identifying a cloud provider or on premise resources, an infrastructure, and one or more applications, tools, and artificial intelligence assets for provisioning the customized platform, as described above.

As further shown in FIG. 6, process 600 may include processing the provisioning data, with a machine learning model, to identify conflicting or redundant applications, tools, or artificial intelligence assets included in the provisioning data and to generate updated provisioning data (block 630). For example, the device (e.g., using virtual computing system 406, processor 520, memory 530, and/or the like) may process the provisioning data, with a machine learning model, to identify conflicting or redundant applications, tools, or artificial intelligence assets included in the provisioning data and to generate updated provisioning data, as described above.

As further shown in FIG. 6, process 600 may include determining computing resource data identifying computing resources, from the cloud provider or the on premise resources, required for execution of the one or more applications, tools, and artificial intelligence assets (block 640). For example, the device (e.g., using virtual computing system 406, processor 520, storage component 540, and/or the like) may determine computing resource data identifying computing resources, from the cloud provider or the on premise resources, required for execution of the one or more applications, tools, and artificial intelligence assets, as described above.

As further shown in FIG. 6, process 600 may include obtaining the one or more applications, tools, and artificial intelligence assets, identified in the updated provisioning data, from a data structure (block 650). For example, the device (e.g., using virtual computing system 406, processor 520, communication interface 570, and/or the like) may obtain the one or more applications, tools, and artificial intelligence assets, identified in the updated provisioning data, from a data structure, as described above.

As further shown in FIG. 6, process 600 may include generating a customized template based on the computing resources, identified in the computing resource data, and the one or more applications, tools, and artificial intelligence assets (block 660). For example, the device (e.g., using virtual computing system 406, processor 520, memory 530, and/or the like) may generate a customized template based on the computing resources, identified in the computing resource data, and the one or more applications, tools, and artificial intelligence assets, as described above.

As further shown in FIG. 6, process 600 may include executing the customized template to provision the computing resources with the one or more applications, tools, and artificial intelligence assets and to create the customized platform (block 670). For example, the device (e.g., using virtual computing system 406, processor 520, storage component 540, and/or the like) may execute the customized template to provision the computing resources with the one or more applications, tools, and artificial intelligence assets and to create the customized platform, as described above.

As further shown in FIG. 6, process 600 may include performing one or more actions based on creating the customized platform (block 680). For example, the device (e.g., using virtual computing system 406, processor 520, memory 530, storage component 540, communication interface 570, and/or the like) may perform one or more actions based on creating the customized platform, as described above.

Process 600 may include additional implementations, such as any single implementation or any combination of implementations described below and/or in connection with one or more other processes described elsewhere herein.

In a first implementation, performing the one or more actions includes enabling a user of the client device to access the customized platform via the client device; enabling one or more other users to access the customized platform via one or more other client devices; or storing data associated with the customized platform in another data structure.

In a second implementation, alone or in combination with the first implementation, performing the one or more actions includes generating passwords for internal communications among the one or more applications, tools, and artificial intelligence assets; recommending an additional application, tool, or artificial intelligence asset for the customized platform; or retraining the machine learning model based on creating the customized platform.

In a third implementation, alone or in combination with one or more of the first and second implementations, performing the one or more actions include receiving, from the client device, credentials associated with a user of the client device, and enabling the user of the client device to access the customized platform via the client device and based on the credentials.

In a fourth implementation, alone or in combination with one or more of the first through third implementations, the selectable items of the user interface include one or more selectable items representing cloud providers, one or more selectable items representing on premise resources, one or more selectable items representing infrastructures, one or more selectable items representing applications, one or more selectable items representing tools, or one or more selectable items representing artificial intelligence assets.

In a fifth implementation, alone or in combination with one or more of the first through fourth implementations, executing the customized template includes generating a container, and executing the customized template, via the container, to provision the computing resources with the one or more applications, tools, and artificial intelligence assets and to create the customized platform.

In a sixth implementation, alone or in combination with one or more of the first through fifth implementations, performing the one or more actions includes receiving, from the client device, data identifying an update to the customized platform, and updating the customized platform based on the data identifying the update.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
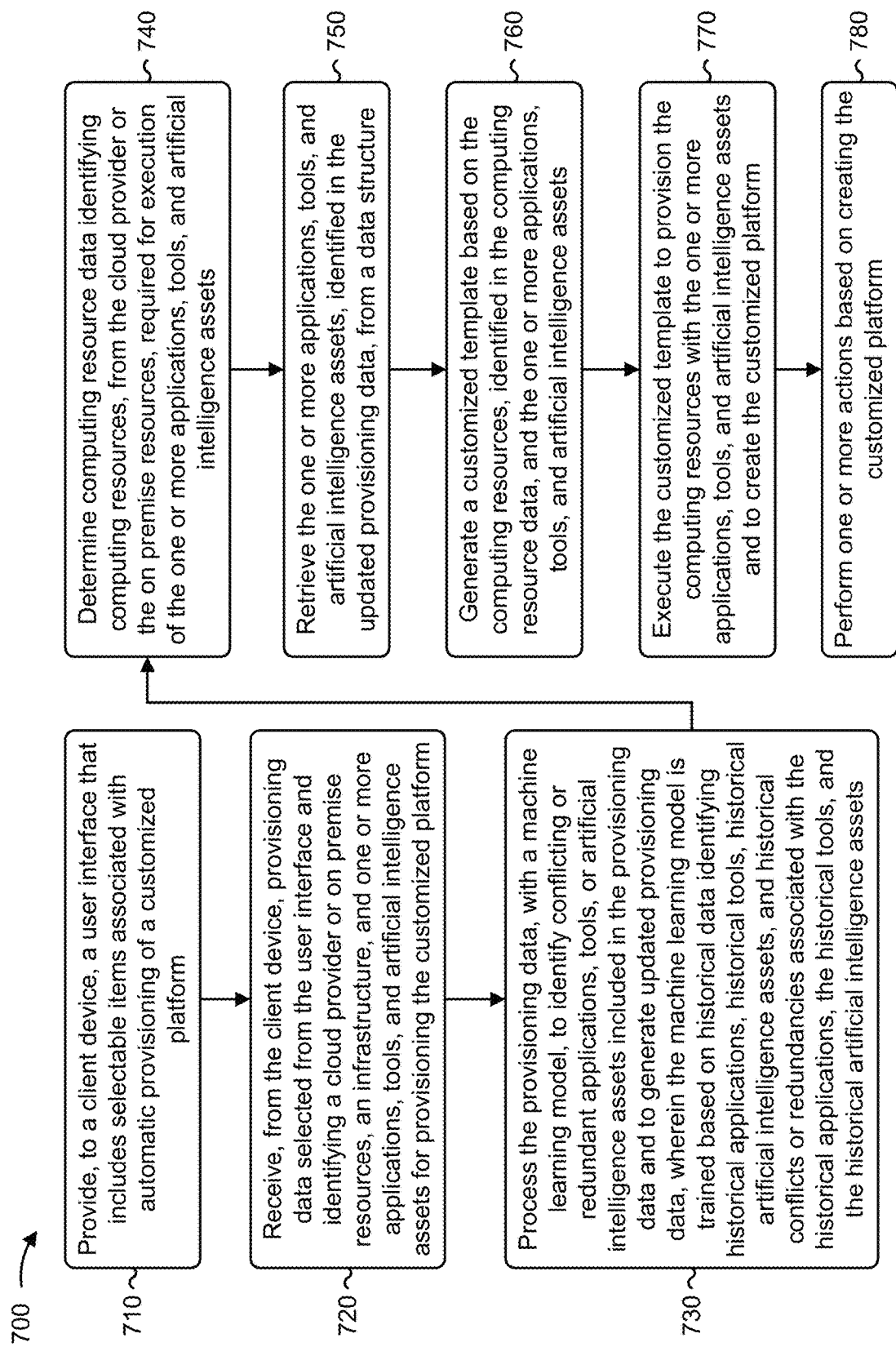

FIG. 7 is a flow chart of an example process 700 for automatically generating and provisioning a customized platform for selected applications, tools, and artificial intelligence assets. In some implementations, one or more process blocks of FIG. 7 may be performed by a device (e.g., provisioning platform 401). In some implementations, one or more process blocks of FIG. 7 may be performed by another device or a group of devices separate from or including the device, such as a client device (e.g., client device 430).

As shown in FIG. 7, process 700 may include providing, to a client device, a user interface that includes selectable items associated with automatic provisioning of a customized platform (block 710). For example, the device (e.g., using virtual computing system 406, processor 520, communication interface 570, and/or the like) may provide, to a client device, a user interface that includes selectable items associated with automatic provisioning of a customized platform, as described above.

As further shown in FIG. 7, process 700 may include receiving, from the client device, provisioning data selected from the user interface and identifying a cloud provider or on premise resources, an infrastructure, and one or more applications, tools, and artificial intelligence assets for provisioning the customized platform (block 720). For example, the device (e.g., using virtual computing system 406, processor 520, communication interface 570, and/or the like) may receive, from the client device, provisioning data selected from the user interface and identifying a cloud provider or on premise resources, an infrastructure, and one or more applications, tools, and artificial intelligence assets for provisioning the customized platform, as described above.

As further shown in FIG. 7, process 700 may include processing the provisioning data to identify conflicting or redundant applications, tools, or artificial intelligence assets included in the provisioning data and to generate updated provisioning data (block 730). For example, the device (e.g., using virtual computing system 406, processor 520, memory 530, and/or the like) may process the provisioning data, with a machine learning model, to identify conflicting or redundant applications, tools, or artificial intelligence assets included in the provisioning data and to generate updated provisioning data, as described above. In some implementations, the machine learning model is trained based on historical data identifying historical applications, historical tools, historical artificial intelligence assets, and historical conflicts or redundancies associated with the historical applications, the historical tools, and the historical artificial intelligence assets.

As further shown in FIG. 7, process 700 may include determining computing resource data identifying computing resources, from the cloud provider or the on premise resources, required for execution of the one or more applications, tools, and artificial intelligence assets (block 740). For example, the device (e.g., using virtual computing system 406, processor 520, storage component 540, and/or the like) may determine computing resource data identifying computing resources, from the cloud provider or the on premise resources, required for execution of the one or more applications, tools, and artificial intelligence assets, as described above.

As further shown in FIG. 7, process 700 may include obtaining the one or more applications, tools, and artificial intelligence assets, identified in the updated provisioning data, from a data structure (block 750). For example, the device (e.g., using virtual computing system 406, processor 520, communication interface 570, and/or the like) may obtain the one or more applications, tools, and artificial intelligence assets, identified in the updated provisioning data, from a data structure, as described above.

As further shown in FIG. 7, process 700 may include generating a customized template based on the computing resources, identified in the computing resource data, and the one or more applications, tools, and artificial intelligence assets (block 760). For example, the device (e.g., using virtual computing system 406, processor 520, memory 530, and/or the like) may generate a customized template based on the computing resources, identified in the computing resource data, and the one or more applications, tools, and artificial intelligence assets, as described above.

As further shown in FIG. 7, process 700 may include executing the customized template to provision the computing resources with the one or more applications, tools, and artificial intelligence assets and to create the customized platform (block 770). For example, the device (e.g., using virtual computing system 406, processor 520, storage component 540, and/or the like) may execute the customized template to provision the computing resources with the one or more applications, tools, and artificial intelligence assets and to create the customized platform, as described above.

As further shown in FIG. 7, process 700 may include performing one or more actions based on creating the customized platform (block 780). For example, the device (e.g., using virtual computing system 406, processor 520, memory 530, storage component 540, communication interface 570, and/or the like) may perform one or more actions based on creating the customized platform, as described above.

Process 700 may include additional implementations, such as any single implementation or any combination of implementations described below and/or in connection with one or more other processes described elsewhere herein.

In a first implementation, process 700 includes receiving, from the client device, an instruction to delete the customized platform; removing the one or more applications, tools, and artificial intelligence assets from the computing resources based on the instruction and to delete the customized platform; and providing, to the client device, a notification indicating that the customized platform is deleted.

In a second implementation, alone or in combination with the first implementation, process 700 includes storing data associated with the customized platform in another data structure; receiving an indication that the customized platform has been deleted; and regenerating the customized platform based on the indication and based on the data associated with the customized platform.

In a third implementation, alone or in combination with one or more of the first and second implementations, process 700 includes determining one or more recommended items for a user of the client device based on a profile associated with the user; and providing the recommended items with the selectable items in the user interface.

In a fourth implementation, alone or in combination with one or more of the first through third implementations, process 700 includes receiving, from the client device, data indicating that one of the selectable items of the user interface is selected; updating the user interface, to generate an updated user interface, based on the data indicating that one of the selectable items of the user interface is selected; and providing the updated user interface to the client device.

In a fifth implementation, alone or in combination with one or more of the first through fourth implementations, the customized platform includes a customized software development and information-technology operations platform.

In a sixth implementation, alone or in combination with one or more of the first through fifth implementations, process 700 includes monitoring usage of the computing resources by the one or more applications, tools, and artificial intelligence assets; determining that an additional computing resource is required, based on the usage of the computing resources; and provisioning the additional computing resource with one or more of the one or more applications, tools, and artificial intelligence assets.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8:
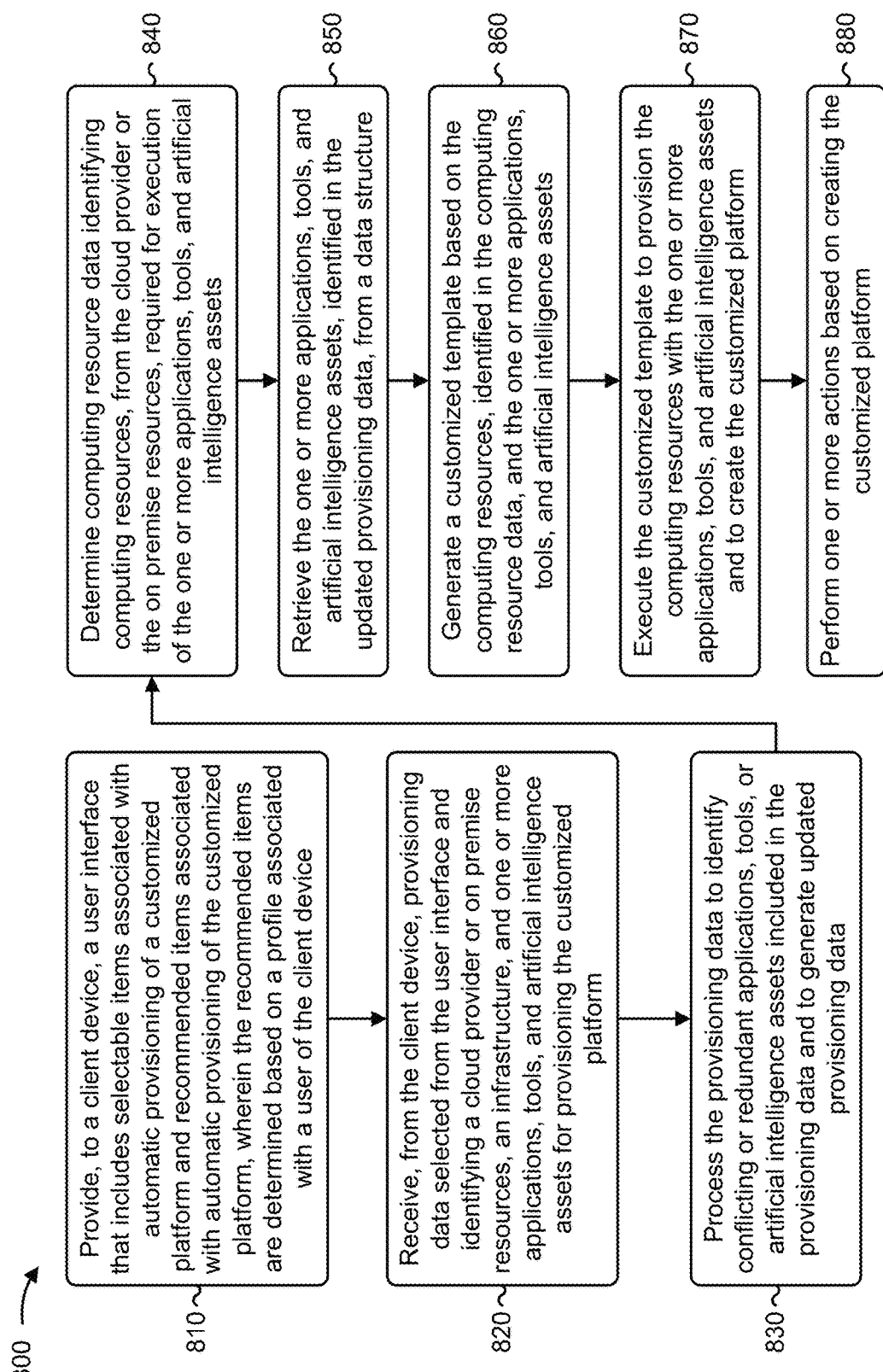

FIG. 8 is a flow chart of an example process 800 for automatically generating and provisioning a customized platform for selected applications, tools, and artificial intelligence assets. In some implementations, one or more process blocks of FIG. 8 may be performed by a device (e.g., provisioning platform 401). In some implementations, one or more process blocks of FIG. 8 may be performed by another device or a group of devices separate from or including the device, such as a client device (e.g., client device 430).

As shown in FIG. 8, process 800 may include providing, to a client device, a user interface that includes selectable items associated with automatic provisioning of a customized platform and recommended items associated with automatic provisioning of the customized platform, wherein the recommended items are determined based on a profile associated with a user of the client device (block 810). For example, the device (e.g., using virtual computing system 406, processor 520, communication interface 570, and/or the like) may provide, to a client device, a user interface that includes selectable items associated with automatic provisioning of a customized platform and recommended items associated with automatic provisioning of the customized platform, as described above. In some implementations, the recommended items are determined based on a profile associated with a user of the client device As further shown in FIG. 8, process 800 may include receiving, from the client device, provisioning data selected from the user interface and identifying a cloud provider or on premise resources, an infrastructure, and one or more applications, tools, and artificial intelligence assets for provisioning the customized platform (block 820). For example, the device (e.g., using virtual computing system 406, processor 520, communication interface 570, and/or the like) may receive, from the client device, provisioning data selected from the user interface and identifying a cloud provider or on premise resources, an infrastructure, and one or more applications, tools, and artificial intelligence assets for provisioning the customized platform, as described above.

As further shown in FIG. 8, process 800 may include processing the provisioning data, with a machine learning model, to identify conflicting or redundant applications, tools, or artificial intelligence assets included in the provisioning data and to generate updated provisioning data (block 830). For example, the device (e.g., using virtual computing system 406, processor 520, memory 530, and/or the like) may process the provisioning data, with a machine learning model, to identify conflicting or redundant applications, tools, or artificial intelligence assets included in the provisioning data and to generate updated provisioning data, as described above.

As further shown in FIG. 8, process 800 may include determining computing resource data identifying computing resources, from the cloud provider or the on premise resources, required for execution of the one or more applications, tools, and artificial intelligence assets (block 840). For example, the device (e.g., using virtual computing system 406, processor 520, storage component 540, and/or the like) may determine computing resource data identifying computing resources, from the cloud provider or the on premise resources, required for execution of the one or more applications, tools, and artificial intelligence assets, as described above.

As further shown in FIG. 8, process 800 may include obtaining the one or more applications, tools, and artificial intelligence assets, identified in the updated provisioning data, from a data structure (block 850). For example, the device (e.g., using virtual computing system 406, processor 520, communication interface 570, and/or the like) may obtain the one or more applications, tools, and artificial intelligence assets, identified in the updated provisioning data, from a data structure, as described above.

As further shown in FIG. 8, process 800 may include generating a customized template based on the computing resources, identified in the computing resource data, and the one or more applications, tools, and artificial intelligence assets (block 860). For example, the device (e.g., using virtual computing system 406, processor 520, memory 530, and/or the like) may generate a customized template based on the computing resources, identified in the computing resource data, and the one or more applications, tools, and artificial intelligence assets, as described above.

As further shown in FIG. 8, process 800 may include executing the customized template to provision the computing resources with the one or more applications, tools, and artificial intelligence assets and to create the customized platform (block 870). For example, the device (e.g., using virtual computing system 406, processor 520, storage component 540, and/or the like) may execute the customized template to provision the computing resources with the one or more applications, tools, and artificial intelligence assets and to create the customized platform, as described above.

As further shown in FIG. 8, process 800 may include performing one or more actions based on creating the customized platform (block 880). For example, the device (e.g., using virtual computing system 406, processor 520, memory 530, storage component 540, and/or the like) may perform one or more actions based on creating the customized platform, as described above.

Process 800 may include additional implementations, such as any single implementation or any combination of implementations described below and/or in connection with one or more other processes described elsewhere herein.

In a first implementation, performing the one or more actions includes enabling a user of the client device to access the customized platform via the client device; enabling one or more other users to access the customized platform via one or more other client devices; storing data associated with the customized platform in another data structure; generating passwords for internal communications among the one or more applications, tools, and artificial intelligence assets; recommending an additional application, tool, or artificial intelligence asset for the customized platform; or retraining the machine learning model based on creating the customized platform.

In a second implementation, alone or in combination with the first implementation, process 800 includes receiving, from the client device, credentials associated with the user of the client device; and enabling the user of the client device to access the customized platform via the client device and based on the credentials.

In a third implementation, alone or in combination with one or more of the first and second implementations, executing the customized template includes generating a container; and executing the customized template, via the container, to provision the computing resources with the one or more applications, tools, and artificial intelligence assets and to create the customized platform.

In a fourth implementation, alone or in combination with one or more of the first through third implementations, process 800 includes receiving, from the client device, data identifying an update to the customized platform; and updating the customized platform based on the data identifying the update.

In a fifth implementation, alone or in combination with one or more of the first through fourth implementations, process 800 includes monitoring usage of the computing resources by the one or more applications, tools, and artificial intelligence assets; determining that an additional computing resource is required, based on the usage of the computing resources; and provisioning the additional computing resource with one or more of the one or more applications, tools, and artificial intelligence assets.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
providing, by a device and to a client device, a user interface that includes selectable items associated with automatic provisioning of a customized platform;
receiving, by the device and from the client device, provisioning data selected from the user interface and identifying a cloud provider or on premise resources, an infrastructure, and first one or more applications, tools, and artificial intelligence assets for provisioning the customized platform;
processing, by the device, the provisioning data, with a machine learning model, to identify conflicting or redundant applications, tools, or artificial intelligence assets included in the provisioning data;
generating updated provisioning data based on one or more of:
identifying the conflicting or the redundant applications,
identifying the conflicting or the redundant tools, or
identifying the conflicting or the redundant artificial intelligence assets;
determining, by the device, computing resource data identifying computing resources, from the cloud provider or the on premise resources, required for execution of second one or more applications, tools, and artificial intelligence assets, identified in the updated provisioning data;
obtaining, by the device, the second one or more applications, tools, and artificial intelligence assets, from a data structure;
generating, by the device, a customized template based on information associated with the computing resources, identified in the computing resource data, and information associated with the second one or more applications, tools, and artificial intelligence assets;
executing, by the device, the customized template to provision the computing resources with the second one or more applications, tools, and artificial intelligence assets, and to create the customized platform; and
performing, by the device, one or more actions based on creating the customized platform.

2. The method of claim 1, wherein performing the one or more actions comprises one or more of:
enabling a user of the client device to access the customized platform via the client device;
enabling one or more other users to access the customized platform via one or more other client devices; or
storing data associated with the customized platform in another data structure.

3. The method of claim 1, wherein performing the one or more actions comprises one or more of:
generating passwords for internal communications among the second one or more applications, tools, and artificial intelligence assets;
recommending an additional application, tool, or artificial intelligence asset for the customized platform; or
retraining the machine learning model based on creating the customized platform.

4. The method of claim 1, wherein performing the one or more actions comprises:
receiving, from the client device, credentials associated with a user of the client device; and
enabling the user of the client device to access the customized platform via the client device and based on the credentials.

5. The method of claim 1, wherein the selectable items of the user interface include:
one or more selectable items representing cloud providers,
one or more selectable items representing at least one of the on premise resources,
one or more selectable items representing infrastructures,
one or more selectable items representing applications,
one or more selectable items representing tools, or
one or more selectable items representing artificial intelligence assets.

6. The method of claim 1, wherein executing the customized template comprises:
generating a container; and
executing the customized template, via the container, to provision the computing resources with the second one or more applications, tools, and artificial intelligence assets and to create the customized platform.

7. The method of claim 1, wherein performing the one or more actions comprises:
receiving, from the client device, data identifying an update to the customized platform; and
updating the customized platform based on the data identifying the update.

8. A device, comprising:
one or more memories; and
one or more processors, communicatively coupled to the one or more memories, configured to:
provide, to a client device, a user interface that includes selectable items associated with automatic provisioning of a customized platform;
receive, from the client device, provisioning data selected from the user interface and identifying a cloud provider or on premise resources, an infrastructure, and first one or more applications, tools, and artificial intelligence assets for provisioning the customized platform;
process the provisioning data, with a machine learning model, to identify conflicting or redundant applications, tools, or artificial intelligence assets included in the provisioning data and to generate updated provisioning data,
wherein the machine learning model is trained based on historical data identifying historical applications, historical tools, historical artificial intelligence assets, and historical conflicts or redundancies associated with the historical applications, the historical tools, and the historical artificial intelligence assets;
determine computing resource data identifying computing resources, from the cloud provider or the on premise resources, required for execution of the first one or more applications, tools, and artificial intelligence assets;

obtain second one or more applications, tools, and artificial intelligence assets, identified in the updated provisioning data, from a data structure;

generate a customized template based on information associated with the computing resources, identified in the computing resource data, and the information associated with the second one or more applications, tools, and artificial intelligence assets;

execute the customized template to provision the computing resources with the second one or more applications, tools, and artificial intelligence assets and to create the customized platform; and perform one or more actions based on creating the customized platform.

9. The device of claim 8, wherein the one or more processors are further configured to:

receive, from the client device, an instruction to delete the customized platform;

remove the second one or more applications, tools, and artificial intelligence assets from the computing resources, based on the instruction, to delete the customized platform; and provide, to the client device, a notification indicating that the customized platform is deleted.

10. The device of claim 8, wherein the one or more processors are further configured to:

store data associated with the customized platform in another data structure;

receive an indication that the customized platform has been deleted;

regenerate the customized platform based on the indication and based on the data associated with the customized platform; and retrain the machine learning model based on regenerating the customized platform.

11. The device of claim 8, wherein the one or more processors, when providing the user interface that includes the selectable items associated with automatic provisioning of the customized platform, are configured to:

determine one or more recommended items for a user of the client device based on a profile associated with the user; and provide the one or more recommended items with the selectable items in the user interface.

12. The device of claim 8, wherein the one or more processors are further configured to:

receive, from the client device, data indicating that one of the selectable items of the user interface is selected;

update the user interface, to generate an updated user interface, based on the data indicating that one of the selectable items of the user interface is selected; and provide the updated user interface to the client device.

13. The device of claim 8, wherein the customized platform includes a customized software development and information-technology operations platform.

14. The device of claim 8, wherein the one or more processors are further configured to:

monitor usage of the computing resources by the second one or more applications, tools, and artificial intelligence assets;

determine that an additional computing resource is required, based on the usage of the computing resources; and provision the additional computing resource with one or more of the second one or more applications, tools, and artificial intelligence assets.

15. A non-transitory computer-readable medium storing instructions, the instructions comprising:

one or more instructions that, when executed by one or more processors, cause the one or more processors to:

provide, to a client device, a user interface that includes:

selectable items associated with automatic provisioning of a customized platform, and recommended items associated with automatic provisioning of the customized platform, wherein the recommended items are determined based on a profile associated with a user of the client device;

receive, from the client device, provisioning data selected from the user interface and identifying a cloud provider or on premise resources, an infrastructure, and first one or more applications, tools, and artificial intelligence assets for provisioning the customized platform;

process the provisioning data to identify conflicting or redundant applications, tools, or artificial intelligence assets included in the provisioning data;

generate updated provisioning data based on one or more of:

identifying the conflicting or the redundant applications, identifying the conflicting or the redundant tools, or identifying the conflicting or the redundant artificial intelligence assets;

determine computing resource data identifying computing resources, from the cloud provider or the on premise resources, required for execution of second one or more applications, tools, and artificial intelligence assets, identified in the updated provisioning data;

obtain the second one or more applications, tools, and artificial intelligence assets, from a data structure;

generate a customized template based on information associated with the computing resources, identified in the computing resource data, and information associated with the second one or more applications, tools, and artificial intelligence assets;

execute the customized template to provision the computing resources with the second one or more applications, tools, and artificial intelligence assets and to create the customized platform; and perform one or more actions based on creating the customized platform.

16. The non-transitory computer-readable medium of claim 15, wherein the one or more instructions, that cause the one or more processors to perform the one or more actions, cause the one or more processors to one or more of:

enable a user of the client device to access the customized platform via the client device;

enable one or more other users to access the customized platform via one or more other client devices;

store data associated with the customized platform in another data structure;

generate passwords for internal communications among the second one or more applications, tools, and artificial intelligence assets; or recommend an additional application, tool, or artificial intelligence asset for the customized platform.

17. The non-transitory computer-readable medium of claim 15, wherein the one or more instructions, that cause the one or more processors to perform the one or more actions, cause the one or more processors to:
- receive, from the client device, credentials associated with the user of the client device; and
- enable the user of the client device to access the customized platform via the client device and based on the credentials.

18. The non-transitory computer-readable medium of claim 15, wherein the one or more instructions, that cause the one or more processors to execute the customized template, cause the one or more processors to:
- generate a container; and
- execute the customized template, via the container, to provision the computing resources with the second one or more applications, tools, and artificial intelligence assets and to create the customized platform.

19. The non-transitory computer-readable medium of claim 15, wherein the one or more instructions, that cause the one or more processors to perform the one or more actions, cause the one or more processors to:
- receive, from the client device, data identifying an update to the customized platform; and
- update the customized platform based on the data identifying the update.

20. The non-transitory computer-readable medium of claim 15, wherein the one or more instructions, when executed by the one or more processors, further cause the one or more processors to:
- monitor usage of the computing resources by the second one or more applications, tools, and artificial intelligence assets;
- determine that an additional computing resource is required, based on the usage of the computing resources; and
- provision the additional computing resource with one or more of the second one or more applications, tools, and artificial intelligence assets.

* * * * *